(12) United States Patent
Laroia et al.

(10) Patent No.: US 9,130,810 B2
(45) Date of Patent: Sep. 8, 2015

(54) OFDM COMMUNICATIONS METHODS AND APPARATUS

(75) Inventors: Rajiv Laroia, Basking Ridge, NJ (US); Junyi Li, Bedminster, NJ (US)

(73) Assignee: QUALCOMM Incorporated, San Diego, CA (US)

(\*) Notice: Subject to any disclaimer, the term of this patent is extended or adjusted under 35 U.S.C. 154(b) by 2815 days.

(21) Appl. No.: 09/931,469

(22) Filed: Aug. 16, 2001

(65) Prior Publication Data
US 2002/0044524 A1    Apr. 18, 2002

Related U.S. Application Data

(63) Continuation-in-part of application No. 09/805,887, filed on Mar. 15, 2001.

(60) Provisional application No. 60/230,937, filed on Sep. 13, 2000.

(51) Int. Cl.
*H04J 11/00* (2006.01)
*H04J 1/00* (2006.01)
*H04B 1/00* (2006.01)
(Continued)

(52) U.S. Cl.
CPC .......... *H04L 27/2626* (2013.01); *H04L 5/0012* (2013.01); *H04L 5/0039* (2013.01); *H04L 5/0041* (2013.01); *H04L 5/0048* (2013.01); *H04L 5/023* (2013.01); *H04L 27/2602* (2013.01); *H04L 27/2605* (2013.01);
(Continued)

(58) Field of Classification Search
CPC ................. H04W 72/02; H04L 27/26–27/389; H04L 5/0012–5/004
USPC ........... 370/203, 210, 343; 375/130, 229, 316
See application file for complete search history.

(56) References Cited

U.S. PATENT DOCUMENTS

| 4,393,276 A | 7/1983 | Steele |
| 4,554,668 A | 11/1985 | Deman et al. |

(Continued)

FOREIGN PATENT DOCUMENTS

| CA | 2348137 | 11/2001 |
| CA | 2477536 | 9/2003 |

(Continued)

OTHER PUBLICATIONS

Tellado, "Multicarrier Modulation with Low Par", Kluwer Academic, Dordrecht, NL XP-002199500, (2000), pp. 6-11 and 55-60.
(Continued)

*Primary Examiner* — Jianye Wu
(74) *Attorney, Agent, or Firm* — Dalei Dong

(57) ABSTRACT

OFDM signal communication methods and apparatus are described. In accordance with the invention OFDM signals are generated in the time domain with symbols being mapped to specific points in time. Training symbols may be included in the transmitted OFDM signal to facilitate symbol recovery. An exemplary receiver of the invention receives the OFDM signal from the communications channel, converts it into the frequency domain, and then filters it in the frequency domain to eliminate tones corresponding to other users. The filtered signal free of MAC interference is then converted into the time domain where channel estimation and compensation operations are performed. After channel compensation symbol recovery is performed in the time domain.

48 Claims, 6 Drawing Sheets

(51) Int. Cl.
*H03H 7/30* (2006.01)
*H04W 72/02* (2009.01)
*H04L 27/26* (2006.01)
*H04L 5/00* (2006.01)
*H04L 5/02* (2006.01)

(52) U.S. Cl.
CPC ........ *H04L27/2614* (2013.01); *H04L 27/2643* (2013.01); *H04L 27/2647* (2013.01)

(56) References Cited

U.S. PATENT DOCUMENTS

| | | | |
|---|---|---|---|
| 4,747,137 A | 5/1988 | Matsunaga | |
| 4,783,779 A | 11/1988 | Takahata et al. | |
| 4,783,780 A | 11/1988 | Alexis | |
| 4,975,952 A | 12/1990 | Mabey et al. | |
| 5,008,900 A | 4/1991 | Critchlow et al. | |
| 5,115,248 A | 5/1992 | Roederer et al. | |
| 5,268,694 A | 12/1993 | Jan et al. | |
| 5,282,222 A | 1/1994 | Fattouche et al. | |
| 5,363,408 A | 11/1994 | Paik et al. | |
| 5,371,761 A | 12/1994 | Daffara et al. | |
| 5,384,810 A | 1/1995 | Amrany et al. | |
| 5,406,551 A | 4/1995 | Saito et al. | |
| 5,410,538 A | 4/1995 | Roche et al. | |
| 5,455,839 A | 10/1995 | Eyuboglu et al. | |
| 5,465,253 A | 11/1995 | Rahnema | |
| 5,491,727 A | 2/1996 | Petit | |
| 5,513,379 A | 4/1996 | Benveniste et al. | |
| 5,539,748 A | 7/1996 | Raith et al. | |
| 5,548,582 A | 8/1996 | Brajal et al. | |
| 5,553,069 A | 9/1996 | Ueno et al. | |
| 5,583,869 A | 12/1996 | Grube et al. | |
| 5,594,738 A | 1/1997 | Crisler et al. | |
| 5,604,744 A | 2/1997 | Andersson et al. | |
| 5,612,978 A * | 3/1997 | Blanchard et al. | 375/346 |
| 5,625,876 A | 4/1997 | Gilhousen et al. | |
| 5,684,491 A | 11/1997 | Newman et al. | |
| 5,726,978 A | 3/1998 | Frodigh et al. | |
| 5,732,113 A | 3/1998 | Schmidl et al. | |
| 5,745,487 A | 4/1998 | Hamaki | |
| 5,768,276 A | 6/1998 | Diachina et al. | |
| 5,790,537 A | 8/1998 | Yoon et al. | |
| 5,812,938 A | 9/1998 | Gilhousen et al. | |
| 5,815,488 A | 9/1998 | Williams et al. | |
| 5,822,368 A * | 10/1998 | Wang | 375/229 |
| 5,828,650 A | 10/1998 | Malkamaki et al. | |
| 5,838,268 A | 11/1998 | Frenkel | |
| 5,867,478 A | 2/1999 | Baum et al. | |
| 5,870,393 A | 2/1999 | Yano et al. | |
| 5,887,023 A | 3/1999 | Mabuchi | |
| 5,907,585 A | 5/1999 | Suzuki et al. | |
| 5,920,571 A | 7/1999 | Houck et al. | |
| 5,926,470 A | 7/1999 | Tiedemann, Jr. et al. | |
| 5,933,421 A | 8/1999 | Alamouti et al. | |
| 5,949,814 A | 9/1999 | Odenwalder et al. | |
| 5,953,325 A | 9/1999 | Willars et al. | |
| 5,955,992 A | 9/1999 | Shattil | |
| 5,956,642 A | 9/1999 | Larsson et al. | |
| 5,995,992 A | 11/1999 | Eckard et al. | |
| 5,999,826 A | 12/1999 | Whinnett | |
| 6,002,942 A | 12/1999 | Park et al. | |
| 6,016,123 A | 1/2000 | Barton et al. | |
| 6,038,150 A | 3/2000 | Yee et al. | |
| 6,038,263 A | 3/2000 | Kotzin et al. | |
| 6,038,450 A | 3/2000 | Brink et al. | |
| 6,052,364 A | 4/2000 | Chalmers et al. | |
| 6,061,337 A | 5/2000 | Light et al. | |
| 6,067,315 A | 5/2000 | Sandin | |
| 6,075,350 A | 6/2000 | Peng et al. | |
| 6,075,797 A | 6/2000 | Thomas | |
| 6,076,114 A | 6/2000 | Wesley et al. | |
| 6,088,345 A | 7/2000 | Sakoda et al. | |
| 6,088,592 A | 7/2000 | Doner et al. | |
| 6,108,323 A | 8/2000 | Gray et al. | |
| 6,108,550 A | 8/2000 | Wiorek et al. | |
| 6,112,094 A | 8/2000 | Dent | |
| 6,128,776 A | 10/2000 | Kang et al. | |
| 6,138,037 A | 10/2000 | Jaamies | |
| 6,141,317 A | 10/2000 | Marchok et al. | |
| 6,154,484 A | 11/2000 | Lee et al. | |
| 6,169,910 B1 | 1/2001 | Tamil et al. | |
| 6,172,993 B1 | 1/2001 | Kim et al. | |
| 6,175,550 B1 | 1/2001 | Van Nee | |
| 6,175,650 B1 | 1/2001 | Sindhu et al. | |
| 6,176,550 B1 | 1/2001 | Lamart et al. | |
| 6,198,775 B1 | 3/2001 | Khayrallah et al. | |
| 6,215,983 B1 | 4/2001 | Dogan et al. | |
| 6,226,280 B1 | 5/2001 | Roark et al. | |
| 6,232,918 B1 | 5/2001 | Wax et al. | |
| 6,240,129 B1 * | 5/2001 | Reusens et al. | 375/346 |
| 6,249,683 B1 | 6/2001 | Lundby et al. | |
| 6,256,478 B1 | 7/2001 | Allen et al. | |
| 6,271,946 B1 | 8/2001 | Chang et al. | |
| 6,272,122 B1 | 8/2001 | Wee | |
| 6,310,704 B1 | 10/2001 | Dogan et al. | |
| 6,317,435 B1 | 11/2001 | Tiedemann, Jr. et al. | |
| 6,335,922 B1 | 1/2002 | Tiedemann, Jr. et al. | |
| 6,337,659 B1 | 1/2002 | Kim et al. | |
| 6,337,983 B1 | 1/2002 | Bonta et al. | |
| 6,353,637 B1 | 3/2002 | Mansour et al. | |
| 6,363,060 B1 | 3/2002 | Sarkar | |
| 6,374,115 B1 | 4/2002 | Barnes et al. | |
| 6,377,539 B1 | 4/2002 | Kang et al. | |
| 6,377,809 B1 | 4/2002 | Rezaiifar et al. | |
| 6,388,998 B1 | 5/2002 | Kasturia | |
| 6,393,008 B1 | 5/2002 | Cheng et al. | |
| 6,393,012 B1 | 5/2002 | Pankaj | |
| 6,401,062 B1 | 6/2002 | Murashima | |
| 6,438,369 B1 | 8/2002 | Huang et al. | |
| 6,449,246 B1 | 9/2002 | Barton et al. | |
| 6,466,800 B1 | 10/2002 | Sydon et al. | |
| 6,473,467 B1 | 10/2002 | Wallace et al. | |
| 6,477,317 B1 | 11/2002 | Itokawa | |
| 6,478,422 B1 | 11/2002 | Hansen | |
| 6,483,820 B1 | 11/2002 | Davidson et al. | |
| 6,487,243 B1 | 11/2002 | Hwang et al. | |
| 6,496,790 B1 | 12/2002 | Kathavate et al. | |
| 6,501,810 B1 | 12/2002 | Karim et al. | |
| 6,507,601 B2 | 1/2003 | Parsa et al. | |
| 6,519,462 B1 | 2/2003 | Lu et al. | |
| 6,529,525 B1 | 3/2003 | Pecen et al. | |
| 6,535,666 B1 | 3/2003 | Dogan et al. | |
| 6,539,008 B1 | 3/2003 | Ahn et al. | |
| 6,539,213 B1 | 3/2003 | Richards et al. | |
| 6,542,485 B1 | 4/2003 | Mujtaba et al. | |
| 6,542,743 B1 | 4/2003 | Soliman | |
| 6,563,806 B1 | 5/2003 | Yano et al. | |
| 6,563,881 B1 | 5/2003 | Sakoda et al. | |
| 6,577,739 B1 | 6/2003 | Hurting et al. | |
| 6,584,140 B1 | 6/2003 | Lee | |
| 6,590,881 B1 | 7/2003 | Wallace et al. | |
| 6,597,746 B1 | 7/2003 | Amrany et al. | |
| 6,601,206 B1 | 7/2003 | Marvasti | |
| 6,614,857 B1 | 9/2003 | Buehrer et al. | |
| 6,625,172 B2 | 9/2003 | Odenwalder et al. | |
| 6,636,568 B2 | 10/2003 | Kadous | |
| 6,654,339 B1 | 11/2003 | Bohnke et al. | |
| 6,654,431 B1 | 11/2003 | Barton et al. | |
| 6,657,949 B1 | 12/2003 | Jones et al. | |
| 6,658,258 B1 | 12/2003 | Chen et al. | |
| 6,674,787 B1 | 1/2004 | Dick et al. | |
| 6,674,810 B1 | 1/2004 | Cheng | |
| 6,675,012 B2 | 1/2004 | Gray et al. | |
| 6,678,318 B1 | 1/2004 | Lai | |
| 6,690,951 B1 | 2/2004 | Cuffaro et al. | |
| 6,693,952 B1 | 2/2004 | Chuah et al. | |
| 6,701,165 B1 | 3/2004 | Ho et al. | |
| 6,704,571 B1 | 3/2004 | Moon | |
| 6,711,400 B1 | 3/2004 | Aura et al. | |
| 6,717,908 B2 * | 4/2004 | Vijayan et al. | 370/206 |
| 6,721,568 B1 | 4/2004 | Gustavsson et al. | |
| 6,724,719 B1 | 4/2004 | Tong et al. | |
| 6,731,602 B1 | 5/2004 | Watanabe et al. | |

(56) References Cited

U.S. PATENT DOCUMENTS

| | | |
|---|---|---|
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard et al. |
| 6,940,827 B2 | 9/2005 | Li et al. |
| 6,940,842 B2 | 9/2005 | Proctor, Jr. |
| 6,940,845 B2 | 9/2005 | Benveniste et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 * | 3/2006 | Shattil ............ 375/259 |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,023,880 B2 | 4/2006 | El-Maleh et al. |
| 7,039,356 B2 | 5/2006 | Nguyen et al. |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun et al. |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius et al. |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman et al. |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal et al. |
| 7,257,167 B2 | 8/2007 | Lau |
| 7,257,406 B2 | 8/2007 | Ji et al. |
| 7,257,423 B2 | 8/2007 | Iochi et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |

(56) References Cited

U.S. PATENT DOCUMENTS

| | | |
|---|---|---|
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,724,777 B2 | 5/2010 | Sutivong et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 | 10/2011 | Classon et al. |
| 8,095,141 B2 | 1/2012 | Teague |
| 8,098,568 B2 | 1/2012 | Laroia et al. |
| 8,098,569 B2 | 1/2012 | Laroia et al. |
| 8,295,154 B2 | 10/2012 | Laroia et al. |
| 8,331,463 B2 | 12/2012 | Jayaraman et al. |
| 8,462,859 B2 | 6/2013 | Sampath et al. |
| 2001/0021180 A1 | 9/2001 | Lee et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122400 A1 | 9/2002 | Vayanos et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |

(56) References Cited

U.S. PATENT DOCUMENTS

| | | |
|---|---|---|
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1 | 7/2004 | Sibecas et al. |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1 | 9/2004 | Haustein et al. |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1 | 11/2004 | Aizawa et al. |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1 | 7/2005 | Jung et al. |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0204247 A1 | 9/2005 | Guo et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1 | 11/2005 | Park et al. |
| 2005/0246548 A1 | 11/2005 | Laitinen et al. |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |

(56) References Cited

U.S. PATENT DOCUMENTS

| | | |
|---|---|---|
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0111148 A1 | 5/2006 | Mukkavilli et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang et al. |
| 2007/0099666 A1 | 5/2007 | Astely et al. |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1 | 5/2009 | Mehta et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0225695 A1 | 9/2009 | Kang et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |

(56) References Cited

U.S. PATENT DOCUMENTS

| | | | |
|---|---|---|---|
| 2012/0140838 | A1 | 6/2012 | Kadous et al. |
| 2013/0016678 | A1 | 1/2013 | Laroia et al. |
| 2013/0208681 | A1 | 8/2013 | Gore et al. |
| 2013/0287138 | A1 | 10/2013 | MA; Jianglei et al. |
| 2013/0315200 | A1 | 11/2013 | Gorokhov et al. |
| 2014/0247898 | A1 | 9/2014 | Laroia et al. |
| 2014/0376518 | A1 | 12/2014 | Palanki et al. |

FOREIGN PATENT DOCUMENTS

| | | | |
|---|---|---|---|
| CA | 2540688 | | 5/2005 |
| CA | 2577369 | | 3/2006 |
| CL | 19931400 | | 12/1994 |
| CL | 1997846 | | 1/1995 |
| CL | 27102004 | | 8/2005 |
| CL | 22892004 | | 9/2005 |
| CL | 30862004 | | 10/2005 |
| CL | 29932005 | | 5/2006 |
| CL | 15212006 | | 3/2007 |
| CL | 14922006 | | 4/2007 |
| CL | 14892006 | | 5/2007 |
| CL | 14902006 | | 5/2007 |
| CL | 46151 | | 12/2009 |
| CN | 1252919 | | 5/2000 |
| CN | 1267437 | | 9/2000 |
| CN | 1267437 | A | 9/2000 |
| CN | 1284795 | | 2/2001 |
| CN | 1296682 | | 5/2001 |
| CN | 1344451 | | 4/2002 |
| CN | 1346221 | | 4/2002 |
| CN | 1383631 | | 12/2002 |
| CN | 1386344 | | 12/2002 |
| CN | 1402916 | A | 3/2003 |
| CN | 1424835 | | 6/2003 |
| CN | 1467938 | A | 1/2004 |
| CN | 1487755 | A | 4/2004 |
| CN | 1520220 | | 8/2004 |
| CN | 1525678 | | 9/2004 |
| CN | 1642051 | A | 7/2005 |
| CN | 1642335 | A | 7/2005 |
| CN | 1647436 | A | 7/2005 |
| DE | 19800653 | A1 | 7/1999 |
| DE | 19800953 | C1 | 7/1999 |
| DE | 19957288 | C1 | 5/2001 |
| DE | 10240138 | | 8/2003 |
| DE | 10254384 | A1 | 6/2004 |
| EP | 0488976 | A2 | 6/1992 |
| EP | 0568291 | A2 | 11/1993 |
| EP | 0740431 | A1 | 10/1996 |
| EP | 0 786 889 | A1 | 7/1997 |
| EP | 0805576 | A2 | 11/1997 |
| EP | 0807989 | A1 | 11/1997 |
| EP | 0844796 | A2 | 5/1998 |
| EP | 0872068 | A1 | 10/1998 |
| EP | 0 981 222 | A2 | 2/2000 |
| EP | 1001570 | A2 | 5/2000 |
| EP | 1047209 | A1 | 10/2000 |
| EP | 1061687 | A1 | 12/2000 |
| EP | 1 091 516 | A1 | 4/2001 |
| EP | 1093241 | A1 | 4/2001 |
| EP | 1148673 | | 10/2001 |
| EP | 1172983 | A2 | 1/2002 |
| EP | 1180907 | A2 | 2/2002 |
| EP | 1187506 | | 3/2002 |
| EP | 1204217 | A1 | 5/2002 |
| EP | 1255369 | A1 | 11/2002 |
| EP | 1267513 | A2 | 12/2002 |
| EP | 1074099 | B1 | 2/2003 |
| EP | 1286490 | A2 | 2/2003 |
| EP | 1335504 | A2 | 8/2003 |
| EP | 1351538 | A1 | 10/2003 |
| EP | 1376920 | A1 | 1/2004 |
| EP | 1392073 | A1 | 2/2004 |
| EP | 1434365 | | 6/2004 |
| EP | 1441469 | | 7/2004 |
| EP | 1445873 | | 8/2004 |
| EP | 1465449 | A1 | 10/2004 |
| EP | 1478204 | A2 | 11/2004 |
| EP | 1507421 | A1 | 2/2005 |
| EP | 1513356 | A2 | 3/2005 |
| EP | 1531575 | A2 | 5/2005 |
| EP | 1533950 | A1 | 5/2005 |
| EP | 1538863 | A1 | 6/2005 |
| EP | 1542488 | | 6/2005 |
| EP | 1061149 | | 11/2005 |
| EP | 16436669 | | 4/2006 |
| EP | 1898542 | A1 | 3/2008 |
| EP | 1941693 | | 7/2011 |
| FR | 2584884 | A1 | 1/1987 |
| GB | 2279540 | A | 1/1995 |
| GB | 2348776 | A | 10/2000 |
| GB | 2412541 | A | 9/2005 |
| IL | 167573 | | 2/2011 |
| IL | 201872 | | 5/2012 |
| JP | H04111544 | A | 4/1992 |
| JP | 4301931 | | 10/1992 |
| JP | H0746248 | A | 2/1995 |
| JP | 7336323 | A | 12/1995 |
| JP | 8116329 | A | 5/1996 |
| JP | 08288927 | | 11/1996 |
| JP | 9008725 | A | 1/1997 |
| JP | H09501548 | A | 2/1997 |
| JP | 9131342 | | 5/1997 |
| JP | 9182148 | | 7/1997 |
| JP | 09214404 | | 8/1997 |
| JP | 9284200 | A | 10/1997 |
| JP | 10117162 | | 5/1998 |
| JP | H10210000 | A | 8/1998 |
| JP | 10322304 | | 12/1998 |
| JP | H11168453 | A | 6/1999 |
| JP | 11191756 | A | 7/1999 |
| JP | 11196109 | | 7/1999 |
| JP | 11508417 | T | 7/1999 |
| JP | 11239155 | A | 8/1999 |
| JP | 11298954 | | 10/1999 |
| JP | 11331927 | A | 11/1999 |
| JP | 2000022618 | A | 1/2000 |
| JP | 2000102065 | A | 4/2000 |
| JP | 2000184425 | | 6/2000 |
| JP | 2000511750 | A | 9/2000 |
| JP | 2000-332724 | | 11/2000 |
| JP | 2001016644 | A2 | 1/2001 |
| JP | 2001045573 | A | 2/2001 |
| JP | 2001057545 | A | 2/2001 |
| JP | 2001156732 | A | 6/2001 |
| JP | 2001238269 | | 8/2001 |
| JP | 2001245355 | A | 9/2001 |
| JP | 2001249802 | | 9/2001 |
| JP | 2001285927 | A | 10/2001 |
| JP | 2001521698 | | 11/2001 |
| JP | 2001526012 | | 12/2001 |
| JP | 2002026790 | | 1/2002 |
| JP | 2002111556 | A | 4/2002 |
| JP | 2002515203 | T | 5/2002 |
| JP | 2002290148 | A | 10/2002 |
| JP | 2002534925 | A | 10/2002 |
| JP | 2002534941 | | 10/2002 |
| JP | 2002538696 | A | 11/2002 |
| JP | 200318054 | | 1/2003 |
| JP | 2003032218 | | 1/2003 |
| JP | 2003500909 | | 1/2003 |
| JP | 200369472 | | 3/2003 |
| JP | 2003101515 | | 4/2003 |
| JP | 2003169367 | A | 6/2003 |
| JP | 2003174426 | | 6/2003 |
| JP | 2003199173 | A | 7/2003 |
| JP | 2003520523 | | 7/2003 |
| JP | 2003235072 | A | 8/2003 |
| JP | 2003249907 | A | 9/2003 |
| JP | 2003292667 | A | 10/2003 |
| JP | 2003318857 | A | 11/2003 |
| JP | 2003347985 | | 12/2003 |
| JP | 2003348047 | | 12/2003 |

(56) References Cited

FOREIGN PATENT DOCUMENTS

| | | | |
|---|---|---|---|
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507151 A | 3/2004 |
| JP | 2004507950 A | 3/2004 |
| JP | 2004153676 | 5/2004 |
| JP | 2004158901 | 6/2004 |
| JP | 2004162388 A | 6/2004 |
| JP | 2004194262 | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2006524930 A | 11/2006 |
| JP | 2007500486 A | 1/2007 |
| JP | 2007503790 | 2/2007 |
| JP | 2007519281 | 7/2007 |
| JP | 2007520309 A | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050063826 A | 6/2005 |
| KR | 100606099 | 7/2006 |
| RU | 95121152 | 12/1997 |
| RU | 2141168 C1 | 11/1999 |
| RU | 2141706 C1 | 11/1999 |
| RU | 2159007 C2 | 11/2000 |
| RU | 2162275 C2 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 | 11/2003 |
| RU | 2225080 | 2/2004 |
| RU | 2235429 C1 | 8/2004 |
| RU | 2235432 | 8/2004 |
| RU | 2237379 C2 | 9/2004 |
| RU | 2238611 C1 | 10/2004 |
| RU | 2242091 C2 | 12/2004 |
| RU | 2250564 | 4/2005 |
| RU | 2257008 | 7/2005 |
| RU | 2267224 | 12/2005 |
| RU | 2005129079 | 2/2006 |
| RU | 2285338 C2 | 10/2006 |
| RU | 2285351 C2 | 10/2006 |
| RU | 2292655 | 1/2007 |
| RU | 2335864 C2 | 10/2008 |
| RU | 2349043 C2 | 3/2009 |
| SU | 1320883 | 6/1987 |
| TW | 508960 B | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 A1 | 4/1994 |
| WO | WO-9521494 A1 | 8/1995 |
| WO | WO-9613920 A1 | 5/1996 |
| WO | WO9701256 | 1/1997 |
| WO | WO9737456 A2 | 10/1997 |
| WO | WO-9746033 A2 | 12/1997 |
| WO | 9800946 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | 9941871 * | 8/1999 |
| WO | WO/99/41871 | 8/1999 |
| WO | WO-9944313 A1 | 9/1999 |
| WO | WO-9944383 A1 | 9/1999 |
| WO | 9952250 | 10/1999 |
| WO | WO9953713 | 10/1999 |
| WO | WO-9959265 A1 | 11/1999 |
| WO | WO9960729 A1 | 11/1999 |
| WO | WO-9965155 A1 | 12/1999 |
| WO | WO0002397 | 1/2000 |
| WO | WO-0004728 | 1/2000 |
| WO | WO0033503 | 6/2000 |
| WO | WO-0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO-0139523 A2 | 5/2001 |
| WO | WO0145300 | 6/2001 |
| WO | WO-0148969 A2 | 7/2001 |
| WO | WO-0158054 A1 | 8/2001 |
| WO | WO-0160104 A1 | 8/2001 |
| WO | WO-0165637 A2 | 9/2001 |
| WO | WO0169814 A1 | 9/2001 |
| WO | WO0182543 A2 | 11/2001 |
| WO | WO-0182544 A2 | 11/2001 |
| WO | WO-0189112 A1 | 11/2001 |
| WO | WO0193505 | 12/2001 |
| WO | WO-0195427 A2 | 12/2001 |
| WO | 0204936 | 1/2002 |
| WO | WO0207375 | 1/2002 |
| WO | WO-0215432 A1 | 2/2002 |
| WO | WO0215616 | 2/2002 |
| WO | WO-0219746 A1 | 3/2002 |
| WO | 0231991 | 4/2002 |
| WO | 0233848 | 4/2002 |
| WO | WO-0245293 A2 | 6/2002 |
| WO | WO0245456 A1 | 6/2002 |
| WO | WO-0246306 A2 | 6/2002 |
| WO | WO0249305 | 6/2002 |

(56) References Cited

FOREIGN PATENT DOCUMENTS

| WO | WO0249385 A2 | 6/2002 |
|---|---|---|
| WO | WO02060138 A2 | 8/2002 |
| WO | WO02065675 | 8/2002 |
| WO | WO02082689 A2 | 10/2002 |
| WO | WO-02082743 A2 | 10/2002 |
| WO | WO02089434 A1 | 11/2002 |
| WO | WO02093782 A1 | 11/2002 |
| WO | WO02093819 | 11/2002 |
| WO | WO02100027 A1 | 12/2002 |
| WO | WO 03001696 A2 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 A1 | 4/2003 |
| WO | WO03034644 A1 | 4/2003 |
| WO | WO03043262 A1 | 5/2003 |
| WO | WO03043369 | 5/2003 |
| WO | WO-03049409 A2 | 6/2003 |
| WO | WO03058871 A1 | 7/2003 |
| WO | WO03067783 | 8/2003 |
| WO | WO-03069816 A2 | 8/2003 |
| WO | WO03069832 A1 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | 2004002011 A1 | 12/2003 |
| WO | WO03103331 | 12/2003 |
| WO | WO2004002047 | 12/2003 |
| WO | 2004008681 | 1/2004 |
| WO | WO2004004370 | 1/2004 |
| WO | WO2004008671 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004030238 | 4/2004 |
| WO | 2004032443 | 4/2004 |
| WO | WO-2004028037 A1 | 4/2004 |
| WO | 2004038972 | 5/2004 |
| WO | WO2004038954 | 5/2004 |
| WO | WO-2004038984 A2 | 5/2004 |
| WO | WO-2004038988 A2 | 5/2004 |
| WO | WO-2004040690 A2 | 5/2004 |
| WO | WO-2004040827 A2 | 5/2004 |
| WO | 2004051872 | 6/2004 |
| WO | WO2004047354 A1 | 6/2004 |
| WO | WO2004049618 A1 | 6/2004 |
| WO | WO-2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO 2004086706 A1 | 10/2004 |
| WO | WO 2004086711 A1 | 10/2004 |
| WO | WO2004095730 A1 | 11/2004 |
| WO | WO 2004095851 A2 | 11/2004 |
| WO | WO2004095854 | 11/2004 |
| WO | WO 2004098072 A2 | 11/2004 |
| WO | WO2004098222 | 11/2004 |
| WO | WO2004102815 | 11/2004 |
| WO | WO2004102816 | 11/2004 |
| WO | 2004114564 A1 | 12/2004 |
| WO | WO2004105272 A1 | 12/2004 |
| WO | WO2004114549 | 12/2004 |
| WO | WO-2004114615 A1 | 12/2004 |
| WO | WO2005002253 A1 | 1/2005 |
| WO | 2005015797 | 2/2005 |
| WO | WO2005011163 A1 | 2/2005 |
| WO | WO-2005015795 A1 | 2/2005 |
| WO | WO2005015810 | 2/2005 |
| WO | WO-2005015941 A2 | 2/2005 |
| WO | WO2005018270 | 2/2005 |
| WO | WO2005020488 A1 | 3/2005 |
| WO | WO2005020490 | 3/2005 |
| WO | WO2005022811 | 3/2005 |
| WO | WO2005025110 A2 | 3/2005 |
| WO | WO2005032004 A1 | 4/2005 |
| WO | WO-2005043780 A1 | 5/2005 |
| WO | WO2005043855 | 5/2005 |
| WO | WO2005046080 | 5/2005 |
| WO | WO-2005055465 A1 | 6/2005 |
| WO | WO2005055484 A1 | 6/2005 |
| WO | WO-2005055527 A1 | 6/2005 |
| WO | WO2005060192 | 6/2005 |
| WO | WO-2005065062 A2 | 7/2005 |
| WO | WO-2005069538 A1 | 7/2005 |
| WO | WO2005074184 | 8/2005 |
| WO | WO-2005086440 A1 | 9/2005 |
| WO | WO-2005096538 A1 | 10/2005 |
| WO | WO2005122628 | 12/2005 |
| WO | WO2006007292 A2 | 1/2006 |
| WO | WO2006019710 | 2/2006 |
| WO | WO-2006026344 A1 | 3/2006 |
| WO | WO2006044487 | 4/2006 |
| WO | WO-2006062356 A1 | 6/2006 |
| WO | WO2006069300 | 6/2006 |
| WO | WO2006069301 | 6/2006 |
| WO | WO2006069397 | 6/2006 |
| WO | WO2006077696 | 7/2006 |
| WO | 2004073276 | 8/2006 |
| WO | 2006099545 | 9/2006 |
| WO | 2006099577 | 9/2006 |
| WO | WO-2006096784 A1 | 9/2006 |
| WO | WO-2006099349 A1 | 9/2006 |
| WO | 2006127544 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | WO-2007022430 A2 | 2/2007 |
| WO | 2007024935 | 3/2007 |
| WO | WO-2007024934 A2 | 3/2007 |
| WO | WO2007025160 | 3/2007 |
| WO | WO-2007051159 A2 | 5/2007 |

OTHER PUBLICATIONS

Bahai, Saltzberg, "System Architecture", *Multi-Carrier Digital Communications*, Kluwer Academic, New York, XP-002199501, (1999), pp. 17-21.

Bingham, "Other Types of MCM", *ADSL, VDSL, Multicarrier Modulation*, John Wiley & Sons, New York, XP-002199502, (2000), pp. 111-113.

J. M. Kappes and S. I. Sayegh, "Programmable Demultiplexer/Demodulator Processor", Comsat Laboratories, pp. 230-234.

Carl R. Nassar, Balasubramaniam Natarajan and Steve Shattil, "Introduction of Carrier Interference to Spread Spectrum Multiple Access", Idris Communications, pp. 1-5.

Chennakeshu, et al. "A Comparision of Diversity Schemes for a Mixed-Mode Slow Frequency-Hopped Cellular System," IEEE, 1993, pp. 1749-1753.

Chennakeshu, et al. "Capacity Analysis of a TDMA-Based Slow-Frequency-Hopped Cellular System," IEEE Transaction on Vehicular Technology, vol. 45., No. 3 August 1996, pp. 531-542.

Chiani. et al. "Outage Evaluation for Slow Frequenc-Hopping Mobile Radio Systems" IEEE Transactions on Communications, vol. 47, No. 12, pp. 1865-1874, Dec. 1999.

Choi, et al., "Design of the Optimum Pilot Pattern for Channel Estimation in OFDM Systems," Global Telecommunications Conference, IEEE Communications Society, pp. 3681-3665, Globecom, Dallas, Texas (2004).

(56) References Cited

OTHER PUBLICATIONS

Czylwik, "Comparison Between Adaptive OFDM and Single Carrier Modulation with Frequency Domain Equalization," IEEE 47th Vehicular Technology Conference, vol. 2, May 4-7, 1997, pp. 885-889.
Das, et al. "On the Reverse Link Interference Structure for Next Generation Cellular Systems," European Microwave Conference, Oct. 11, 2004, pp. 3068-3072.
Dinis, et al., "A Multiple Access Scheme for the Uplink of Broadband Wireless Systems," IEEE Global Telecommunications Conference, 2004, GLOBECOM '04, vol. 6, Nov. 29-Dec. 3, 2004, pp. 3808-3812.
Hill, et al., "Cyclic Shifting and Time Inversion of Partial Transmit Sequences to Reduce the Peak-to-Average Power Ratio in OFDM," IEEE International Symposium on Personal. Indoor and Mobile Radio Communications. vol. 2, Sep. 18, 2000, Piscataway, NJ, p.
Je, et al. "A Novel Multiple Access Scheme for Uplink Cellular Systems," IEEE Vehicular Technology Conference, Sep. 26, 2004 pp. 984-988.
Kaleh, "Channel Equalization for Block Transmission Systems," IEEE Journal on Selected Areas in Communications, vol. 13, No. 1, Jan. 1995, pp. 110-121.
Keller, et al., "Adaptive Multicarrier Modulation: A Convenient Framework for Time-Frequency Processing in Wireless Communications," Proceedings of the IEEE, vol. 88, No. 5, May 2000, pp. 611-640.
Kim, et al. "Performance of TDMA System with SFH and 2-Bit Differentially Detected GMSK Over Rayleigh Fading Channel," IEEE Vehicular Technology Conference, Apr. 28, 1996, pp. 789-793.
Kishiyama Y et al: "Investigation of Optimum Pilot Channel Structure for VSF-OFCDM Broadband Wireless Access in Forward Link", IEEE Vehicular Technology Conference, New York, NY, US, vol. 4, pp. 139-144, Apr. 22, 2003.
Kostic, et al. "Fundamentals of Dynamic Frequency Hopping in Cellular Systems," IEEE Journal on Selected Areas in Communications, vol. 19, No. 11, Nov. 2001 pp. 2254-2266.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Lacroix, et al., "A Study of OFDM Parameters for High Data Rate Radio LAN's." 2000 IEEE 51st Vehicular Technology Conference Proceedings, vol. 2, May 5-18, 2000, pp. 1075-1079.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ. pp. 519-523.
Lott, "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al., "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications, vol. 45, No. 8, Aug. 1997.
Nassar, Carl R., et al., "High-Performance MC-CDMA via Carrier Interferometry Codes", IEEE Transactions on Vehicular Technology, vol. 50, No. 6, Nov. 2001.
Sarl, et al., "Transmission Techniques for Digital Terrestrial TV Broadcasting," IEEE Communications Magazine, Feb. 1995, pp. 100-109.
Schnell, et al., "A Promising New Wideband Multiple-Access Scheme for Future Mobile Communications Systems," European Transactions on Telecommunications. Wiley & Sons, Chichester, GB, vol. 10, No. 4, Jul. 1999, pp. 417-427.
Schnell, et al, "Application of IFDMA to Mobile Radio Transmission," IEEE 1998 International Conference on Universal Personal Communications, vol. 2, Oct. 5-9, 1998, pp. 1267-1272.
Sklar: "Formatting and Baseband Transmission", Chapter 2, pp. 54, 104-106, Digital Commuications, Jan. 2001.
Tellambura, "Use of m-sequences for OFDM Peak-to-Average Power Ratio Reduction," Electronics Letters. vol. 33, No. 15, Jul. 17, 1997, pp. 1300-1301.
Torrieri, "Cellular Frequency-Hopping CDMA Systems," IEEE Vehicular Technology Conference, May 16, 1999, pp. 919-925.
Xiaodong, et al., "M-Sequences for OFDM Peak-to-Average Power Ratio Reduction and Error Correction," Electronics Letters, vol. 33, Issue 7, Mar. 27, 1997, pp. 554-555.
3rd Generation Partnership Proiect: Technical Specification Group Radio Access Network Physical Layer Aspects for Evolved UTRA (Release 7), 3GPP TR 25.814 v0.3.1 (Nov. 2005).
International Search Report—PCT/US01/028315, International Search Authority—European Patent Office—Jun. 21, 2002.
International Preliminary Exam Report—PCT/US01/028315, International Preliminary Examining Authority—US, Apr. 11, 2003.
Hermann Rohling et al.,: "Performance Comparison Of Different Multiple Access Schemes For the Downlink of an OFDM Communication System", Vehicular Technology Conference, 1997, 47th IEEE, vol. 3, May 4-7, 1997, pp. 1365-1369.
Karsten Bruninghaus et al.,: "Multi-Carrier Spread Spectrum and It's relationship to Single-Carrier Transmission", Vehicular technology Conference, 1998, VTC 98, 48th IEEE: vol. 3, May 18-21, 1998, pp. 2329-2332.
Sorger U. et al., "Interleave FDMA-a new spread-spectrum multiple-access scheme", IEEE Int. Conference on Atlanta, GA, USA Jun. 7-11, 1998, XP010284733.
Chiani, et al. "Outage Evaluation for Slow Frequency-Hopping Mobile Radio Systems" IEEE Transactions on Communications, vol. 47, No. 12, Dec. 1999, pp. 1865-1874.
Chow J. S, "A cost-effective maximum likelihood reciever for multicarrier systems," Proc. IEEE Int. Conf. On Comm., 1992, 948-952.
Naofal Al-Dhahir, "Optimum Finite-Length Equalization for Multicarrier Transceivers," IEEE Trans. On Comm., 1996, 56-64.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
Schnell et al., "Application Of IFDMA to Mobile Radio Transmission", IEEE 1998 International Conference on Universal Personal Communications, vol. 2, Oct. 5-9, 1998, pp. 1267-1272.
Shattil, et al., "Array Control Systems for Multicarrier Protocols Using a Frequency-Shifted Feedback Cavity," IEEE, 1999.
Wang, et al., "Improving performance of multi-user OFDM systems using bit-wise interleaver, XP006017222," Electronics Letters IEE Stevenage, 2001, 37 (19), 1173-1174.
Yun, et al., Performance Of an LDPC-Coded Frequency-Hopping QFDMA System Based on Resource Allocation in the Uplink, Italy May 17-19, 2004, Piscataway, NJ, USA.
XP010766497, Vehicular Technology-Conference 2004. VTO 2004-Spring, 2004 IEEE 59th Milan, 2004, 4, 1925-1928.
3GPP TS 33.220 V.1.1.0 XX.XX, "3rd Generation Partnership Projects; Technical Specification Group Services and System Aspects; Generic Authentication Architecture (GAA); Generic Bootsrapping Architecture (Release 6)" Feb. 9, 2004, pp. 1-17, figure 4, XP002996023.
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA. pp. 1121-1124.
Groe, et al., "CDMA Mobile Radio Design," Sep. 26, 2001, Artech House, Norwood, MA 02062, pp. 257-259.
International Search Report—PCT/US01/028315, International Search Authority—European Patent Office, Jun. 21, 2002 (060542).

(56) References Cited

OTHER PUBLICATIONS

International Search Report PCT/US06/003947—International Search Authority—European Patent Office Jun. 12, 2006.
John B. Groe, Lawrence E. Larson, "CDMA Mobile Radio Design" Sep. 26, 2001, Artech House, Norwood, MA02062 580530, XP002397967, pp. 157-159.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Black-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Molisch, et al., MIMO systems with antenna selection, IEEE Microwave Magazine, URL: http://ieeexplore.ieee.org/iel5/6668/28677/01284943.pdf, Retrived on Dec. 8, 2006, pp. 46-56 (2004).
NET Working Group, T. Dierks, C. Allen, Certicom; The TLS Protocol Version 1.0; Jan. 1999.
NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
TIA/EIA/IS-2000 "Standards for CDMA2000 Spread Spectrum System" Version 1.0 Jul. 1999.
TIA/EIA/IS-95 "Mobile Station-Base Station Compatibility Standard for Dual-Mode Wideband Spread Spectrum Cellular System" Jul. 1993.
TIA-1121.001 "Physical Layer for Ultra Mobile Broadband (UMB) Air Interface Specification," 3GPP2 C.S0084-001-0. Version 2.0 (Aug. 2007).
TIA-1121.002 "Medium Access Control Layer for Ultra Mobile Broadband (UMB) Air Interface Specification," 3GPP2 C/S0084-002-0, Version 2.0 (Aug. 2007).
Tomcik, J.: "MBFDD and MBTDD Wideband Mode: Technology Overview," IEEE 802.20 Working Group Mobile Broadband Wireless Access, Jan. 2006, pp. 1-109, XP002429968.
Tomcik, J.: "QFDD Technology Overview Presentation," IEEE 802.20 Working Group on Mobile Broadband Wireless Access, Slides/pp. 1-73, Nov. 15, 2005 and Oct. 28, 2005.
Toufik I et al., "Channel Allocation algorithms for multi-carrier systems", Vehicular Technology Conference, 2004. VTC2004-Fall, 2004 IEEE 60th Los Angeles, CA, USA Sep. 26-29, 2004, pp. 1129-1133, XP010786798, ISBN: 07-7803-8521-7.
Zekri, et al., "DMT Signals with Low Peak-to-Average Power Ratio," Proceedings, IEEE International Symposium on Computers and Communications, 1999, Jul. 6-8, 1999, pp. 362-368.
Blum et al, "On Optimum MIMO with antenna selection," IEEE International Conference on Communications: Conference Proceedings, vol. 1, Apr. 28, 2002, pp. 386-390.
Catreux, S. et al.: "Simulation results for an interference-limited multiple input multiple output cellular system"., Global Telecommmunications Conference, 2000. GLOBECOM '00. IEEE. Dec. 1, 2000. vol. 2, pp. 1094-1096 http://ieeexplore.ieee.org/iel5/7153/19260/00891306.pdf?tp=&isnumber=19260&arnumber=8913063&punumber=7153.
Chung, S. et al.: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
El Gamal, et al.: "Universal Space-Time Coding," IEEE Transactions on Information Theory, vol. 49, Issue 5, pp. 1097-1119, XP011074756, ISSN: 0018-9448, May 2003.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Kiessling et al, "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, 1997.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1- 050249, 3GPP, Apr. 4, 2005, pp. 1-8.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Qualcomm Europe: "Description and link simulations for OFDMA based E-UTRA uplink" 3GPP Draft; R1-051100, 3rd Generation Partnership Project (3GPP), Mobile Competence Centre; 650, Route Des Lucioles; F-06921 Sophia-Antipolis Cedex; France, vol. RAN WG1, no. San Diego, USA; 20051004, Oct. 4, 2005, pp. 1-10, XP050100715.
Widdup, B. et al., "A highly-parallel VLSI architecture for a list sphere detector," IEEE International Conference, Paris, Fance, vol. 5, pp. 2720-2725 (2004).
Wiesel, A. et al.: "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, p. 36-40, XP010713463.
European Search Report—EP10011743, Search Authority—Munich Patent Office, Dec. 20, 2010.
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005.
Translation of Office Action in Chinese Application 2006800295980 corresponding to U.S. Appl. No. 11/260,895, CN1346221 and CN1383631 dated Feb. 16, 2011.
Translation of Office Action in Korean application 10-2007-7031029 corresponding to U.S. Appl. No. 11/260,931, US20030202491 and KR20040063057 dated Jan. 28, 2011.
Translation of Office Action in Chinese application 200680040236.1 corresponding to U.S. Appl. No. 11/261,065, US20040048609 and CN1402916 dated Feb. 18, 2011.
Translation of Office Action in Chinese application 200680048832.4 corresponding to U.S. Appl. No. 11/261,158, CN1132474 dated Dec. 31, 2010.
Translation of Office Action in Japanese Application 2008-514880 corresponding to U.S. Appl. No. 11/445,377, JP2007519281 and JP2006505172 dated Nov. 9, 2010.
Translation of Office Action in Japanese application 2008-528103 corresponding to U.S. Appl. No. 11/260,924, JP2005502218, JP2004534456, JP2003348047, JP2003199173, JP2004529524, JP11508417, JP2001238269, JP2005130491 and JP2003500909 dated Feb. 8, 2011.

(56) References Cited

OTHER PUBLICATIONS

Translation of Office Action in Japanese Application 2008-529216 corresponding to U.S. Appl. No. 11/261,159, GB2348776, WO2004098222, WO2005065062 and WO2004102815.Dated Jan. 11, 2011.
Translation of Office Action in Japanese application 2008-538181 corresponding to U.S. Appl. No. 11/511,735, WO04064295, JP2002515203, JP8288927, JP7336323 and JP200157545 dated Jan. 25, 2011.
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Translation of Office Action in Canadian application 2625987 corresponding to U.S. Appl. No. 11/261,065, CA2557369 dated Apr. 12, 2011.
B. Sklar, "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-106.
Kappes, J.M., and Sayegh, S.I., "Programmable Demultiplexer/Demodulator Processor," COMSAT Laboratories, IEEE, Mar. 11, 1990, pp. 230-234.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Siemens, Evolved UTRA uplink scheduling and frequency reuse[online], 3GPP TSG-WG1 # 41 R1-050476, Internet <URL:http://www.3gpp.org/ftp/tsg_ran/WG1_RL1/TSGR1_41/Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Ken Murakami et al., "Status Toward Standardization at IEEE 802.3ah and Challenge to System Architecture," Technical Report of the Institute of Electronics, Information and Communication Engineers, Jun. 13, 2003, vol. 103, No. 124, pp. 1-6, IN2003-24.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, no. St. Julian; 20070403, Apr. 3, 2007, XP050105640 [retrieved on Apr. 3, 2007].
European Search Report—EP10184156—Search Authority—Munich—Jun. 14, 2012.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf0/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.IEEE802.Org/20/Contribs/C802.20-05-68.ZIP.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Nokia: "Compact signalling of multi-code allocation for HSDPA", version 2,3GPP R1-02-0018, Jan. 11, 2002.
Samsung: "Uplink Transmission and Multiplexing for EUTRA", 3GPP Draft; R1-050605 UL Multiplexing, Jun. 16, 2005, XP050111420.
Sethi M, et al., "Code Reuse DS-CDMA—A Space Time Approach", Proceedings of the 2002 IEEE International Conference on Acoustics, Speech, and Signal Processing (ICASSP), pp: 2297-2300, May 13-17, 2002.
Bhushan N., "UHDR Overview", C30-20060522-037, Denver, CO, May 22, 2006, pp. 1- 115.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola, "Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Feb. 7, 2012].
Tomcik J., "QFDD and QTDD: Proposed Draft Air Interface Specification," IEEE 0802.20-05/69, IEEE 802.20 Working Group on Mobile Broadband Wireless Access, Oct. 28, 2005, p. 1-6,1-7,1-16,6-65,7-11,7-33,7-37~7-55,9-21,9-22,9-24~9-32.
Digital cellular telecommunications system (Phase 2+); General Packet Radio Service (GPRS); Mobile Station (MS)—Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.
Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.
European Search Report—EP14178034—Search Authority—Munich—Jun. 5, 2015.
Frescura et al., "DSP Based OFDM Demodulator and Equalizer for Professional DVB-T Receivers," IEEE Transactions on Broadcast-

(56) References Cited

OTHER PUBLICATIONS ing, Sep. 1999, pp. 323-332, vol. 45, No. 3, IEEE Service Center, Piscataway, NJ, USA, XP011083078, ISSN: 0018-9316.

Steiner B., "Performance aspects of an MC/JD-CDMA mobile radio system employing non-contiguous frequency bands", IEEE, 49th Vehicular Technology Conference, Houston, TX, USA May 16-20, 1999, Piscataway, NJ, USA, IEEE, US, vol. 1, May 16, 1999, pp. 30-34, XP010342028, DOI: 10.1109/VETEC.1999.778010, ISBN: 978-0-7803-5565-1, I. Introduction, II. System model, III.A. Test Symbol Based Approach, IV. Simulation results, figures 1,2.

Tufvesson F., et al., "Pilot Assisted Channel Estimation for OFDM in Mobile Cellular Systems," IEEE 47th Vehicular Technology Conference, Phoenix, May 4-7, 1997, IEEE Vehicular Technology Conference, NY, IEEE, US vol. 3, Conference 47,XP010229045, pp. 1639-1643.

Van De Beek J.J., et al., "Synchronization of a TDMA-OFDM frequency hopping system", Vehicular Technology Conference, 1998, VTC 98, 48th IEEE Ottawa, Ontario, Canada May 18-21, 1998, New York, NY, USA, IEEE, US, vol. 2, May 18, 1998, pp. 1290-1294, XP010287974, DOI: 10.1109/VETEC.1998.686447, ISBN: 978-0-7803-4320-7.

* cited by examiner

OFDM COMMUNICATIONS METHODS AND APPARATUS

CROSS-REFERENCE TO RELATED APPLICATIONS

This application claims the benefit of the filing date of U.S. Provisional Application No. 60/230,937, filed Sep. 13, 2000, and is a continuation-in-part of pending U.S. patent application Ser. No. 09/805,887, filed Mar. 15, 2001, both of which are titled "SIGNALING METHOD IN AN OFDM MULTIPILE ACCESS WIRELESS SYSTEM," and both of which are hereby expressly incorporated by reference.

TECHINICAL FIELD

This invention relates to orthogonal frequency division multiplexing (OFDM) communication systems, and more particularly to methods and apparatus for implementing OFDM transmitters and receivers suitable for use in, e.g., a multiple access communication network.

BACKGROUND

Orthogonal frequency division multiplexing (OFDM) is a relatively well known multiplexing technique for communication systems. OFDM communication systems can be used to provide multiple access communication, where different users are allocated different orthogonal tones within a frequency bandwidth to transmit data at the same time. In an OFDM communication system, the entire bandwidth allocated to the system is divided into orthogonal tones. In particular, for a given symbol duration T available for user data transmission, and a given bandwidth W, the number of available orthogonal tones F is given by WT. The spacing between the orthogonal tones $\Delta$ is chosen to be $1/T$, thereby making the tones orthogonal. In addition to the symbol duration T which is available for user data transmission, an additional period of time $T_c$ can be used for transmission of a cyclic prefix. The cyclic prefix is prepended to each symbol duration T and is used to compensate for the dispersion introduced by the channel response and by the pulse shaping filter used at the transmitter. Thus, although a total symbol duration of $T+T_c$ is employed for transmitting an OFDM symbol, only the symbol duration T is available for user data transmission and is therefore called an OFDM symbol duration.

In prior OFDM techniques, an OFDM signal is first constructed by a transmitter in the frequency domain by mapping symbols of a constellation to prescribed frequency tones. The signal constructed in the frequency domain is then transformed to the time domain by an inverse discrete Fourier transform (IDFT) or inverse fast Fourier transform (IFFT). A cyclic prefix having duration Tc, as discussed above, is then prepended to the time domain signal corresponding to each symbol duration T resulting in a signal which has the total symbol duration T+Tc for each symbol to be transmitted. The time domain signal including the cyclic prefixes is sampled to obtain the digital signal samples to be transmitted.

In general, symbols of the constellation have a relatively low peak-to-average ratio property. For example, symbols of a QPSK constellation all have the same amplitude. However, after being transformed by the IDFT or IFFT, the resultant time domain signal samples are the weighted sum of all the symbols, and therefore generally do not preserve the desirable low peak-to-average ratio property. In particular, the resulting time domain signal typically has a high peak-to-average ratio.

Since symbols are mapped to tones in known OFDM transmitters in the frequency domain, symbol recovery is also performed in the frequency domain, e.g., with received signals corresponding to individual tones being mapped back in the frequency domain to individual symbols.

FIG. 1 illustrates an exemplary known OFDM receiver 100. The OFDM receiver 100 includes an antenna 102, tuner 104, A/D converter 106, cyclic prefix discarding circuit 108, FFT circuit 110, training symbol extraction circuit 112, a frequency domain channel estimation circuit 114, a frequency domain channel equalization circuit 118 and decoder 118 coupled together as illustrated in FIG. 1.

Broadcast OFDM signals are received via antenna 102 and then filtered by tuner 104 which outputs a signal which includes the OFDM tones used to transmit symbols. The continuous signal output by the tuner 104 is sampled by A/D converter 106 to generate a digital signal which is then processed by the cyclic prefix discarding circuit 108. Circuit 108 discards the portion $T_c$ of the received signal corresponding to the cyclic prefix. The remaining portion of the signal corresponding to the symbol duration T is supplied to the transform circuit 110, e.g., an FFT or DCT circuit, which converts the time domain signal representing the transmitted symbols into the frequency domain. Training symbol extractor 112 extracts one or more training symbols or pilot tones, i.e., symbols or tones with known transmitted values in the frequency domain, from the received signal. The extracted training symbols/tones are supplied to the frequency domain channel estimation circuit 114. The circuit 114 estimates the effect, in the frequency domain, of the communications channel on the transmitted signals as evidenced by the difference between the between the received training symbol(s) or pilot tone(s) and the expect values. Frequency domain channel equalization circuit 116 receives channel estimation information from circuit 114 and performs channel equalization operations on the frequency domain signal generated by transform circuit 110 to compensate for channel distortions. After channel equalization is performed in the frequency domain, the signal is processed by decoder 118 which maps the frequency domain signal into symbols and/or data.

Existing techniques for implementing OFDM communication systems can be highly inefficient in terms of power utilization due to the relatively high peak-to-average ratio when compared with other signaling schemes, such as single carrier modulation schemes. As a result, existing OFDM techniques are not well suited for a wireless multiple access communication network with highly mobile users because the high peak-to-average ratio of the transmitted signal requires a large amount of power at the base station and at the wireless device. The large power requirements result in short battery life and more expensive power amplifiers for handheld wireless communication devices or terminals. Accordingly, it is desirable to provide an OFDM technique which reduces the peak-to-average ratio of the signal to be transmitted, while simultaneously taking advantage of the larger communication bandwidth offered by an OFDM communication system.

SUMMARY

The present invention is directed to OFDM communications systems wherein data symbols are generated, e.g., modulated, and recovered in the time domain as opposed to the frequency domain.

The transmitter of the present invention modulates data symbols in the time domain to a prescribed set of time instants corresponding to a symbol duration. The mapped symbols are smoothly connected to form the transmitted OFDM signal such that the generated signal corresponding to a user includes only frequency components at the tones allocated to that particular user. The time domain OFDM signaling method of the present invention has the advantage over the known frequency domain OFDM signaling method in that it can, in many cases, provide a substantially lower peak-to-average ratio.

In various embodiments, the time-domain OFDM signaling method of the present invention is used to implement a multiple access communication (MAC) system. In the MAC embodiment, different users are allocated different sets of tones for use during the same OFDM symbol period. In the multiple access system, the transmitted signals from different transmitters, each using a set of tones allocated to a different user, are often mixed in the communications channel prior to arriving at an individual user's receiver. In such a case, the signals of other users are multiple access interference to the signal of the individual user trying to recover the data which was communicated on the user's allocated tones.

In accordance with one exemplary receiver embodiment of the present invention, in order to eliminate multiple access interference the receiver first samples the received signal, discards samples corresponding to transmitted cyclic prefixes, and then transforms the remaining signal from the time domain to the frequency domain, e.g., by performing an FFT operation. After the signal has been converted into the frequency domain, the signal is filtered to remove tones of other users. This results in a signal including the tones allocated to the user of the receiver but not other users.

After removal of the tones of other users from the signal, the signal is converted back into the time domain to facilitate recovery of the transmitted symbols. The transformation to the time domain can be implemented by, e.g., performing an Inverse Discrete Fourier Transform (IDFT) operation on the filtered signal.

Time domain channel estimation and equalization techniques are then used to reduce and/or eliminate signal distortions introduced by the communications channel.

In order to facilitate channel estimation and equalization operations, training symbols are included in the transmitted OFDM signal by the transmitter of the present invention along with the symbols used to convey the user's data. The training symbols are known by the receiver prior to their receipt allowing the receiver to estimate the distortions introduced by the channel by comparing the received training symbol values to their known expected values.

In one exemplary embodiment of the invention, during each OFDM symbol period, one or more training symbols are transmitted to a user's device along with data symbols used to convey the user's data. The training symbols are used as discussed above, during time domain signal processing, to estimate the response of the communication channel. The resulting channel estimate is then used in a channel equalization operation to facilitate the recovery of the transmitted data symbols.

In one particular exemplary embodiment, users in a MAC system of the present invention are allocated a set of tones to be used for a time period called a dwell. The dwell corresponds to a number of successive symbol transmission periods. In accordance with one such embodiment, the tones allocated to a user during each successive symbol period of a dwell remain the same. In that particular exemplary embodiment, training symbols are transmitted during some, e.g., one, but not all of the symbol periods in each dwell. The period or periods in which training symbols are transmitted are called training symbol periods. In one such embodiment, a symbol period at or near the center of the dwell is used for transmitting training symbols while data symbols are transmitted during the other symbol periods of each dwell. In accordance with such embodiments where training symbols are not transmitted during all the symbol periods, the channel estimates generated from training symbols received during a training symbol period of a dwell are used during the other symbol periods of the same dwell for channel equalization purposes.

Additional features, elements, and embodiments of the communications system of the present invention will be discussed in detail below.

DETAILED DESCRIPTION

Figure 2:
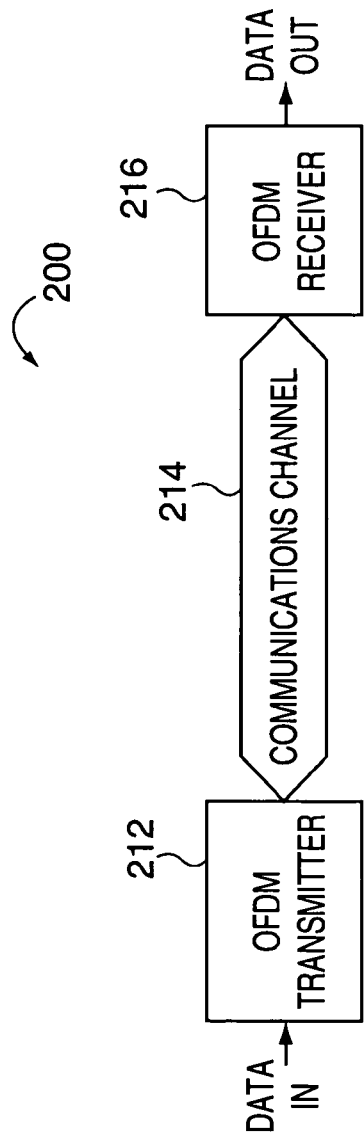
FIG. 2 is a diagram of an OFDM communications system implemented in accordance with the present invention.

FIG. 2 illustrates a communications system 200 implemented in accordance with the present invention. The system 200 includes an OFDM transmitter 212 and an OFDM receiver 216 coupled together by a communications channel 214. The OFDM transmitter 212 and OFDM receiver 216 are implemented in accordance with the present invention as will be discussed in detail below. The communications channel 214 may be, e.g., the air in a wireless communications embodiment. The communications channel 214 may introduce into the transmitted signal a wide range of distortions including, e.g., noise, multi-path distortions, etc. In addition, signals transmitted to/from multiple users of the OFDM system 200 may become mixed in the communications channel 214. As a result of being sent through the communications channel 214 the signal received by the OFDM receiver 216 may be different from the signal transmitted by the OFDM transmitter 212. As will be discussed below, the receiver 216 performs one or more channel compensation operations, in accordance with various features of the invention, to compensate for, and/or reduce, the effect of signal distortions introduced by the communications channel 214.

In the traditional OFDM transmission method discussed above, an OFDM signal is formed by modulating symbols to frequency tones, respectively, where the symbols represent the user information to be transmitted and where the symbols are selected from some signal constellation. This traditional method of generating an OFDM signal is referred to herein as frequency-domain OFDM signaling since signal creation is performed primarily in the frequency domain.

In accordance with one feature of the transmitter of the present invention, an OFDM signal is created in the time domain as opposed to the frequency domain. Accordingly, the technique of the present invention is referred to as time-domain OFDM signaling. In time domain OFDM signaling data symbols are modulated in the time domain to a prescribed set of time instants, e.g., uniformly spaced instants within a symbol period T. The mapped symbols are then smoothly connected to form a continuous signal, e.g., the OFDM signal to be transmitted during all or a portion of a symbol period T. The process is repeated for each symbol period. The techniques of the present invention used to create the continuous signal to be transmitted from the discrete points mapped in the time domain during each symbol period T are such that the generated signal will include only frequency components at the OFDM signal tones designated for communicating the symbols.

An exemplary transmitter of the present invention and exemplary time domain OFDM signal generation technique of the invention will now be discussed with reference to FIGS. 3-6. Additional techniques and circuits for generating OFDM signals in the time domain in accordance with the invention are discussed in detail in U.S. patent application Ser. No. 09/805,887 which is incorporated herein by reference.

Figure 3:
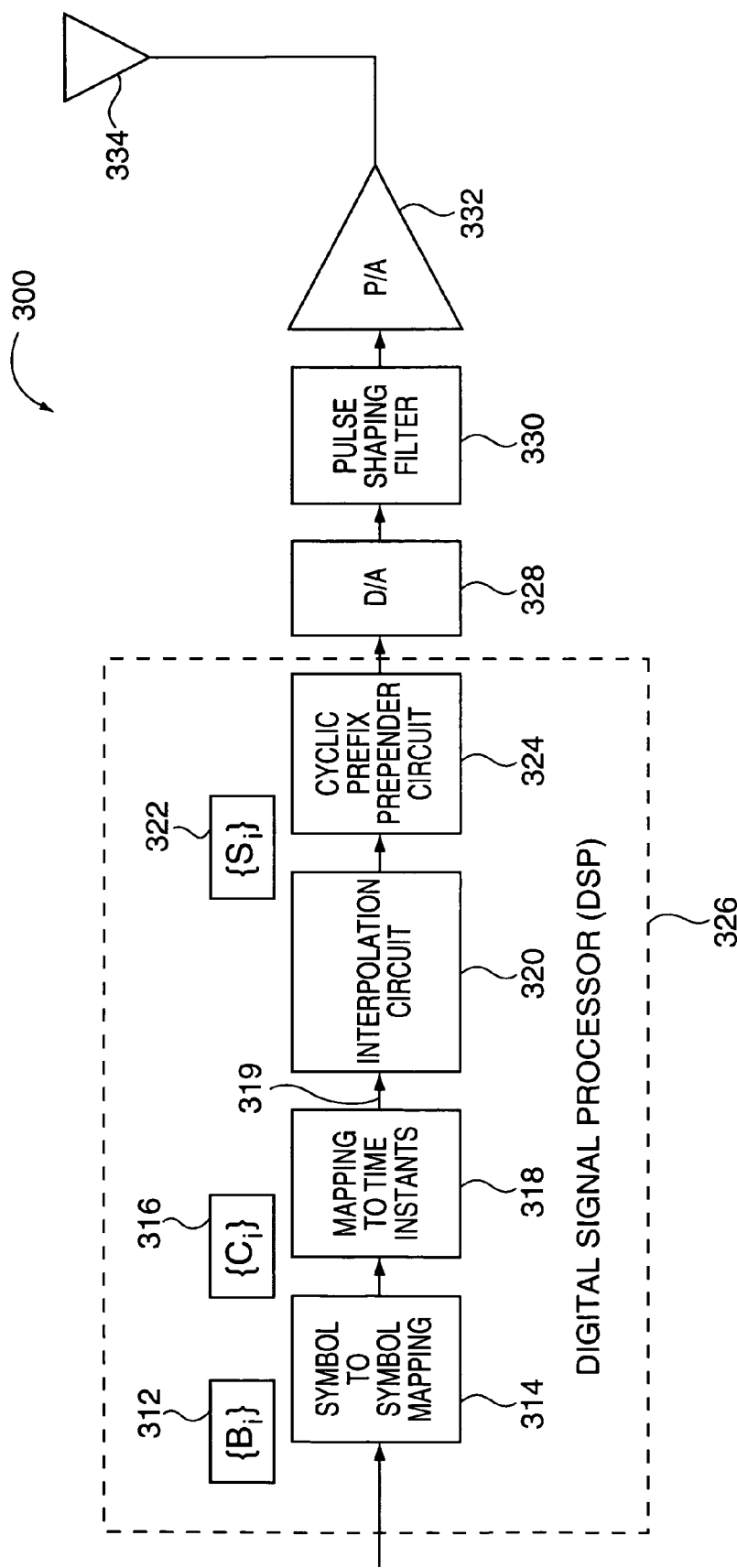
FIG. 3 is a block diagram of a transmitter implemented in accordance with the invention.

Referring now to FIG. 3, an orthogonal frequency division multiplexing (ODFM) transmitter 210 is shown. OFDM transmitter 210 receives a first constellation of symbols $\{B_i\}$ 312 and provides the symbols to a symbol-to-symbol mapping circuit 314, that produces a second constellation of complex symbols $\{C_i\}$ 316. The complex symbols 316 represent data or a stream of data to be transmitted by the OFDM communication system, and may be chosen from a variety of symbol constellations including, but not limited to phase shift keying (PSK) and quadrature amplitude modulation (QAM) symbol constellations. The symbol-to-symbol mapping performed by the mapping circuit 314 is an optional step performed by the OFDM transmitter 210.

Next, a time instant mapping circuit 318 maps each complex symbol 316 to a prescribed time instant within a given OFDM symbol duration. The mapping operation is performed in the time domain such that the mapping circuit 318 generates a discrete signal of mapped symbols within the time domain symbol duration. The output of the mapping circuit 318 is provided to an interpolation circuit 320, that produces a series of digital signal samples $\{S_i\}$ 22. The digital signal samples 322 are formed by sampling a continuous signal, which is constructed by applying one or more predetermined continuous interpolation functions to the mapped complex symbols 319. Alternatively, the digital signal samples 322 are formed by directly applying one or more predetermined discrete interpolation functions to the mapped complex symbols 319. When using the technique of applying discrete interpolation functions, no intermediate continuous signal is generated and the step of sampling the continuous signal is not necessary. The operation of the interpolation circuit 320 is described in greater detail below. A cyclic prefix circuit 324 receives the series of digital signal samples 322 from the interpolation circuit 320 and prepends a cyclic prefix to the digital signal samples 322. The cyclic prefix circuit 324 operates to copy and prepend the last portion of the digital signal sample vector S 322 to the beginning of the OFDM symbol duration. The resulting digital signal samples 322 with the prepended cyclic prefix are converted to an analog signal by a digital to analog converter 328. The resulting analog signal is further processed by a pulse shaping filter 330, the output of which is modulated to a carrier frequency, and amplified by a power amplifier unit 332 for transmission through an antenna 34.

Figure 4:
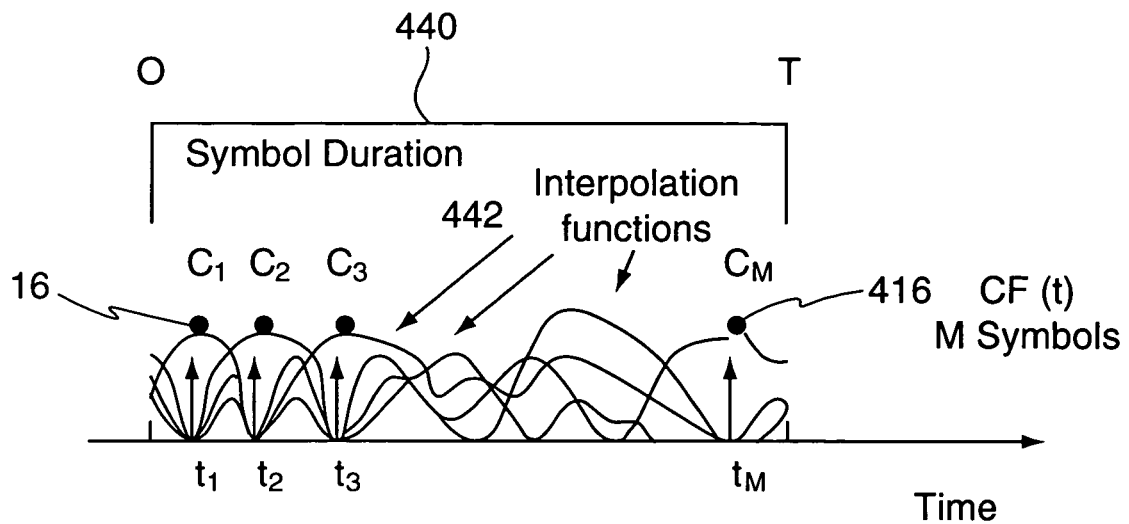
FIG. 4 is a graph showing symbols mapped to prescribed time instants in the time domain according to the OFDM transmission technique implemented by the transmitter of FIG. 3.

FIG. 4 graphically depicts the signal processing steps performed by the various circuits of the DSP 26 in one exemplary embodiment. More specifically, FIG. 4 shows the construction of the signal to be transmitted in a given OFDM time domain symbol duration 440. The time domain symbol duration 440 is a time interval from 0 to T. For purposes of the following description, the OFDM symbol duration T does not include the cyclic prefix. The signal to be transmitted in the symbol duration 440 is represented by complex symbols $C_1$, $C_2$, $C_3$, ..., $C_M$ 16 that are mapped to the prescribed time instants, where M denotes the number of symbols to be transmitted in the symbol duration 440.

In one implementation, the OFDM transmitter 210 is a multiple access communication system where the entire bandwidth available to the users of the system is divided into F orthogonal frequency tones, $f_1$, $f_2$, ..., $f_F$. In the given symbol duration 440, a user within the multiple access communication system is allocated M frequency tones $f_{i(1)}$, $f_{i(2)}$, ..., $f_{i(m)}$, which is a subset of $f_1$, $f_2$, ..., $f_F$ (the total number of frequency tones) in order to transmit a signal, e.g., a signal representing M symbols. The remaining frequency tones can be used by other users of the transmitter 210 or other transmitters which form party of a communications system. This technique allows OFDM transmitter 210 to operate as part of a multiple access communication system.

For a given user, the transmitter 210 first maps the complex data symbols $C_1$, $C_2$, $C_3$, ..., $C_M$ 416 to $t_1$, $t_2$, $t_3$, ..., $t_m$, respectively, where $t_1$, $t_2$, $t_3$, ..., $t_m$ are M prescribed time instants within the time domain symbol duration 440. The mapping operation generates a discrete signal of mapped symbols. It should be noted that the number of prescribed time instants is equal to the number of symbols M to be transmitted. As described above, the symbol mapping occurs in the time domain. Continuous interpolation functions 442 are then applied to the discrete signal of mapped symbols 416 to generate a continuous function CF(t) for t in the time interval from 0 to T.

The interpolation functions 442 are constructed such that the values of the continuous function CF(t) at time instants $t_1$, $t_2$, $t_3$, ..., $t_M$ are respectively equal to $C_1$, $C_2$, $C_3$, ..., $C_M$ and the frequency response of the continuous function CF(t) contains only sinusoids at the allocated tones. Therefore, CF(t) is constructed as $$CF(t) = \sum_{k=1}^{M} A_k e^{J2\pi f_{i(k)} t}$$

where $J=\sqrt{-1}$ and coefficients $A_k$ are given by $$\begin{bmatrix} A_1 \\ M \\ A_M \end{bmatrix} = \begin{bmatrix} e^{J2\pi f_{i(1)} t_1} & \Lambda & e^{J2\pi f_{i(M)} t_1} \\ M & & M \\ e^{J2\pi f_{i(1)} t_M} & \Lambda & e^{J2\pi f_{i(M)} t_M} \end{bmatrix}^{-1} \begin{bmatrix} C_1 \\ M \\ C_M \end{bmatrix}$$

Thus, each time domain signal coefficient $A_k$ is generated by multiplying a matrix of predetermined sinusoids with the single column of data symbols $C_1$, $C_2$, $C_3$, ..., $C_M$ 416.

Figure 5:
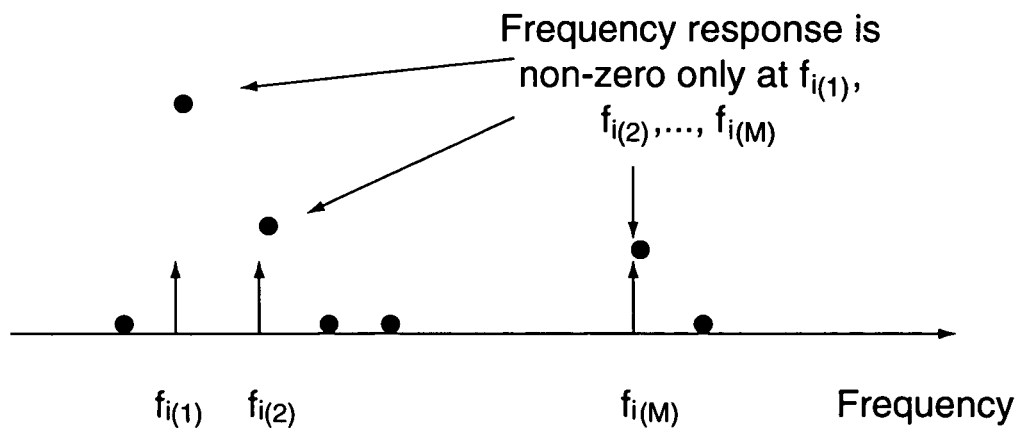
FIG. 5 is a graph showing the frequency domain response of the graph of FIG. 4.

FIG. 5 shows the frequency response of the continuous function CF(t), which is the composite of the M interpolated signals shown in FIG. 4. More specifically, FIG. 5 shows that, in accordance with the present invention, the frequency response of the continuous function is non-zero only at the M frequency tones $f_{i(1)}$, $f_{i(2)}$, ..., $f_{i(m)}$ allocated to the particular user, and is zero at all other frequency tones.

Preferably, the tones in the transmitted OFDM signal allocated to an individual user will be equally spaced in the frequency domain and, optionally, contiguous tones in the overall set of tones that are used in the system 200. At the receiver, tones corresponding to other users may be interspaced with the tones allocated to a particular user due to mixing in the communications channel 214.

Thus, in a multi-user system, the transmitted signal corresponding to a single user may suffer interference from signals (tones), corresponding to other users. In addition, in the communication channel, the transmitted signal may interact with signals from other communications systems, reflections of the transmitted signal and noise sources. This results in distortions in the received signal. Thus, both in the frequency and time domains a received signal will be different from the signal which was transmitted.

Figure 6:
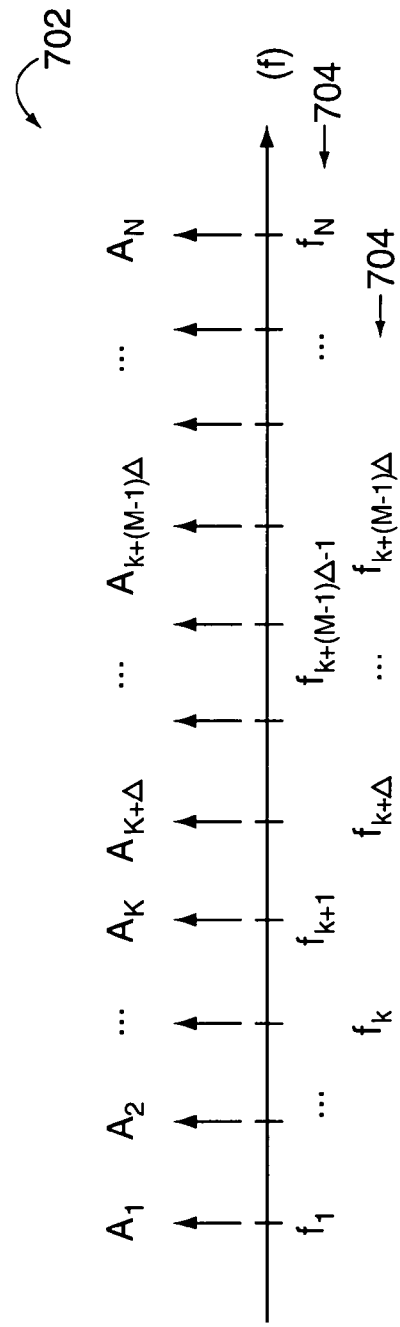
FIG. 6 is a graph showing the tones allocated to a plurality of users of the communications system shown in FIG. 2.

Reference numeral 702 is used in FIG. 6 to refer to a diagram illustrating the N tones transmitted by a plurality of system users during a single exemplary OFDM symbol duration. Reference number 704 is used to identify the set of M tones assigned to the exemplary user. The remaining N-M tones are used by other users. In the FIG. 6 example, Δ is greater than the minimum tone spacing resulting in tones $f_{k+1}$ and $f_{[k+(M-1)\Delta]-1}$ being interspaced with the tones 704 used by the exemplary user.

Symbols are mapped by the transmitter in the time domain in accordance with the present invention and are similarly recovered by the receiver 216 in the time domain. However, to remove distortions in a user's transmitted symbols created by tones used by other system users, received signals are first filtered in the frequency domain to reduce and/or eliminate the effect of tones assigned to other users before attempting to recover a user's transmitted symbols in the time domain.

While filtering in the frequency domain can eliminate the effect of other user's tones, channel distortions remain a problem to time domain symbol recovery. While traditional OFDM channel compensation techniques focus on channel compensation being performed in the frequency domain, such conventional channel compensation techniques can prove unsuitable for recovery of symbols which were initially generated in the time domain and are to be recovered in the time domain.

In accordance with one feature of the present invention, in contrast to known OFDM systems, channel compensation is performed in the time domain as opposed to the frequency domain. In order to facilitate such channel compensation, known symbol values, sometimes call training symbols, are transmitted along with data symbols. By comparing the expected training symbol time domain signal values to received time domain signal values, the effect of the communications channel on the user's transmitted signal can be estimated and then corrected for, e.g., in a channel equalization operation. Alternatively, the training symbols in the time domain can be used to train the equalizer directly without the first step of channel estimation.

Figure 7:
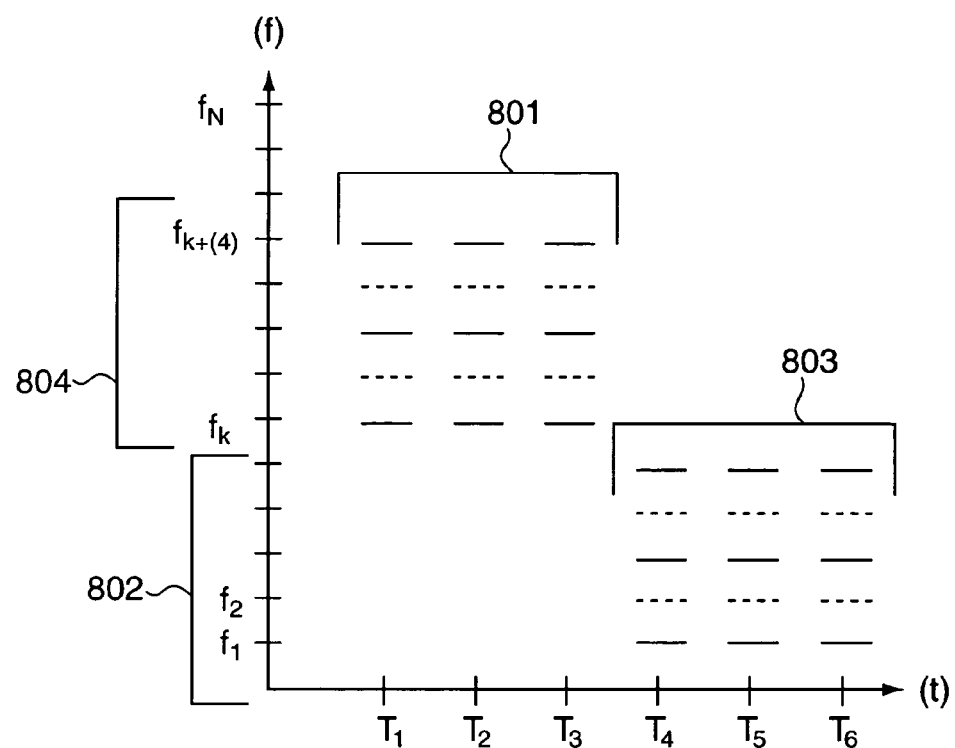
FIGS. 7 and 8 illustrate different techniques for transmitting training symbols in accordance with various embodiments of the present invention.
Figure 8:
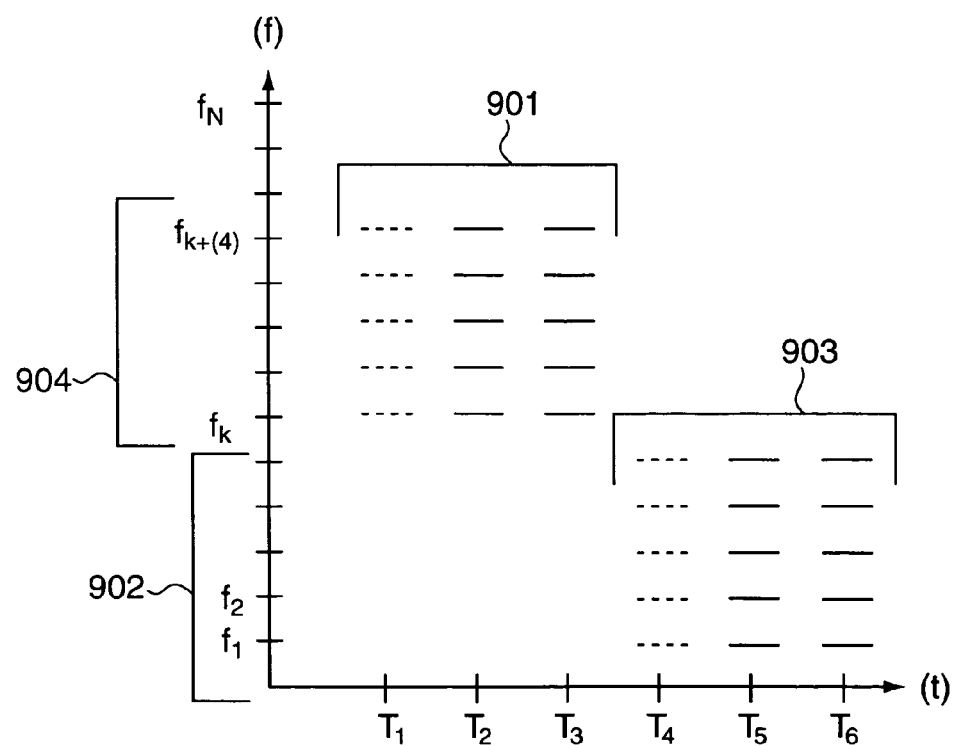

FIGS. 7 and 8 illustrate two alternative techniques for transmitting training symbols in accordance with the present invention. In the FIGS. 7 and 8 examples an exemplary user is allocated a set of M tones from a plurality of N total tones. In the examples M=5. After a preselected number of symbol transmission periods, 3 in the FIGS. 7 and 8 examples, the user is allocated a new set of M tones to be used for transmission purposes. The time period in which a user is allocated a fixed set of tones is referred to as the dwell. In each of FIGS. 7 and 8 two dwell periods are illustrated (801, 803) and (901, 903).

In the FIG. 7 example during dwell 801, the user is allocated a first set of tones 802 to be used. During the second dwell 803, the second set of tones 804 is used. During each symbol duration T in the dwell 802 two training symbols are transmitted and 3 data symbols. The tones corresponding to the transmitted training symbols are shown in FIGS. 7 and 8 using dashed lines while tones corresponding to data symbols are shown using sold lines.

The continuous transmitted signal is created in the time domain by treating the training symbols as two of the symbols to be transmitted and then generating a continuous signal from the training symbols and data symbols to be transmitted during a symbol period in accordance with the present invention.

Transmission of the two training symbols in the FIG. 7 example results in the inability to use the bandwidth corresponding to some, i.e., two, tones for the transmission of data during each symbol duration of the dwell 801, 803. However, it provides channel compensation information to the receiver during each symbol period.

In cases where a dwell corresponds to multiple symbol periods, efficiency in terms of communication bandwidth can be achieved in accordance with one feature of the invention by transmitting training symbols during a subset of the symbol transmission periods which exist within a dwell. All or only some of the tones allocated to a user may be used for transmission of the training symbols during the symbol period or periods of the dwell during which training symbols are transmitted. Channel information derived from the training symbols received during one symbol period are then used during those symbol periods of the same dwell in which no training symbols are received for channel compensation purposes. This channel compensation technique is particularly well suited where changes in channel conditions are likely to be small throughout the dwell period which is the case in many practical embodiments.

FIG. 8 illustrates an example where all the tones in one symbol transmission period of a dwell are used to communicate training symbols. The tones during the other symbol transmission periods of each dwell are used to transmit data. In one particular embodiment, the symbol period during which the training symbols are transmitted is located in the middle of the dwell. Note that in the FIG. 7 example ⅖ of the bandwidth (tones) allocated to a user is used during each dwell to communicate training symbols while in the FIG. 8 example only ⅓ of the bandwidth is used for the transmission of training symbols. In implementations where dwells include a relatively large number of symbol transmission periods, even greater efficiency can be achieved by using the FIG. 8 approach to transmitting training symbols as opposed to the FIG. 7 technique.

Figure 1:
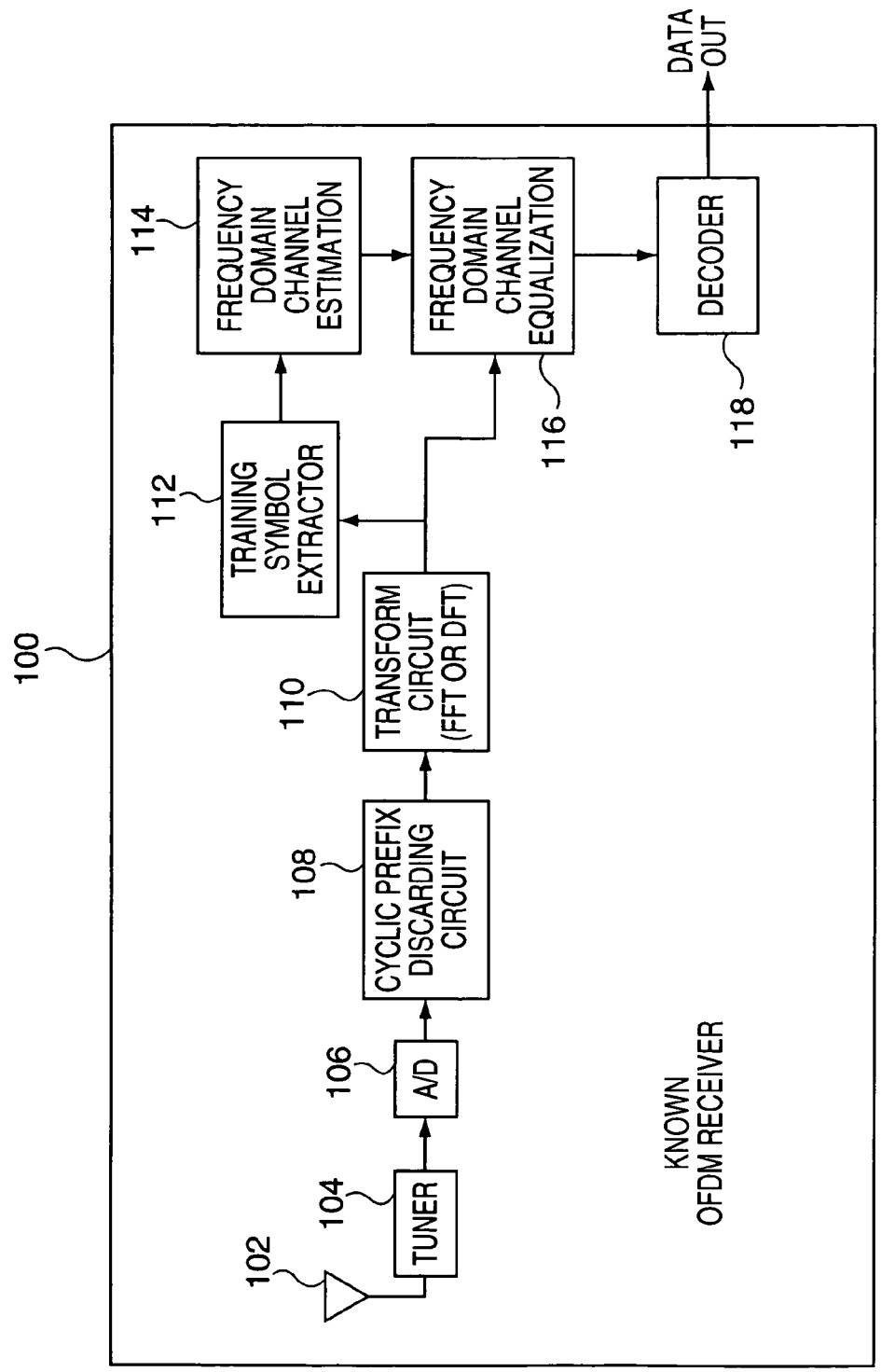
FIG. 1 is a block diagram of a known OFDM receiver.
Figure 9:
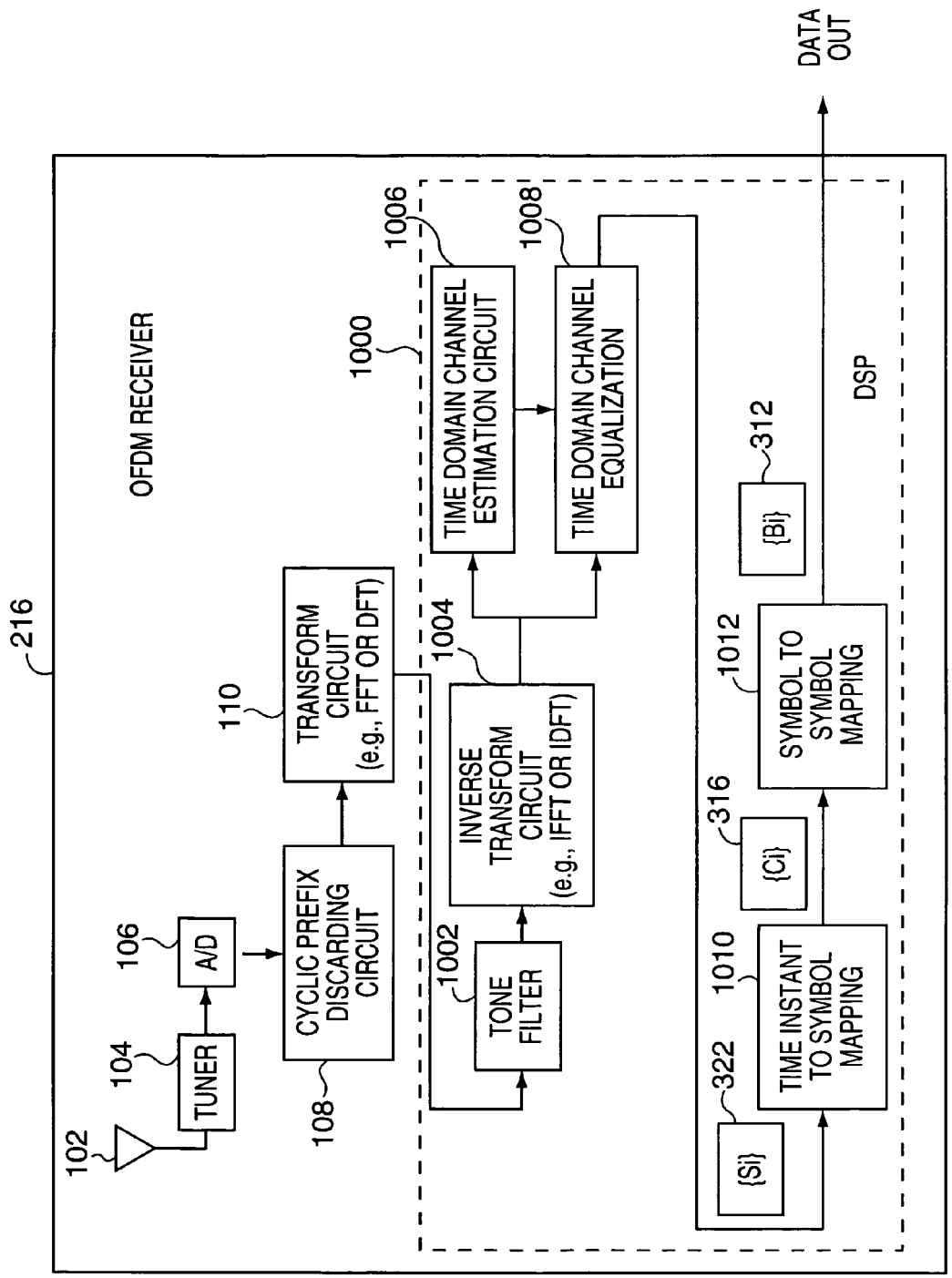
FIG. 9 illustrates an OFDM receiver of the present invention suitable for use in the communications system of FIG. 2.

FIG. 9 illustrates an OFDM receiver 216 implemented in accordance with the present invention which is designed to receive OFDM signals which were originally generated in the time domain, e.g., using one of the techniques described in U.S. patent application Ser. No. 09/805,887. Various elements of the receiver 216 which can be implemented using elements which are the same as, or similar to, elements of the known receiver 100 are identified in both FIGS. 1 and 9 using the same names and numbers.

The receiver 216 of the present invention includes an antenna 102, tuner 104, A/D converter 106, cyclic prefix discarding circuit 108, transform circuit 110 and a digital signal processor 1000.

Signals are received by antenna 102 and filtered by the tuner 104 to reduce and/or eliminate signals outside the set of frequencies used by the OFDM communications system 200.

A/D converter 106 converts the analog filtered signal output by tuner 104 to a digital signal which is then supplied to circuit 108. Cyclic prefix discarding circuit 108 discards the cyclic prefix portion of the received signal leaving the signal portion corresponding to the transmitted symbols to be processed by transform circuit 110. Transform circuit 110 converters the time domain signal output by cyclic prefix discarding circuit 108 into a frequency domain signal by performing a frequency transform operation, e.g., a fast Fourier transform (FFT) or discrete Fourier transform (DFT) operation, thereon. Once transformed into the frequency domain, the signal is supplied to digital signal processor 1000 which is responsible for recovering the symbols transmitted by a user.

The DSP 1000 includes a plurality of modules and/or circuits for performing various signal processing functions. In accordance with the present invention, the circuits and/or modules may be implemented using dedicated hardware and/or software which controls a processor to perform the module's and/or circuit's functions.

The DSP 1000 includes a tone filter 1002, an inverse transform circuit 1004, time domain channel estimation circuit 1006, time domain channel equalization circuit 1008, time instant to symbol mapping module 1010 and a symbol to symbol mapping module 1012. Tone filter 1002 filters out tones corresponding to users other than the user of the receiver 216. Thus, the filter 1002 filters out tones used by the communication system which are not allocated to the particular user of the receiver 216. In this manner multiple access interference is removed.

Inverse transform circuit 1004 performs a frequency to time transform operation on the filtered signal by performing, e.g., an IFFT or IDFT operation, thereby generating a time domain signal. The generated time domain signal is supplied to the time domain channel estimation circuit 1006 and the time domain channel equalization circuit 1008.

The time domain channel estimation circuit 1006 extracts the training symbols from the time domain signal generated by transform circuit 1004 and performs channel estimation operations based on the difference between the received training symbol value in the time domain and the expected training symbol value. As discussed above, training symbols may be transmitted during each symbol transmission period. In such an embodiment, the channel function estimated based on the received training symbols is applied, or extrapolated and then applied, to the other symbols received in the same symbol period as the training symbols upon which a particular channel estimation is based.

In the case where training symbols are transmitted during one symbol transmission period of a dwell, time domain channel estimation circuit 1006 estimates the channel function for each of the symbol periods in the dwell based on the set of training symbols received during the training symbol period of the dwell.

The time domain channel estimation circuit 1006 may use one or more known techniques for estimating the channel function in the time domain based on the received training symbols. Since known techniques, based on a comparison of the received training symbol value and the expected training symbol value are employed, the particulars of the channel estimation techniques will not be discussed further.

In accordance with one embodiment of the present invention, a different channel estimation is made for each point in time of a symbol duration at which a symbol allocated to the user of the OFDM receiver is positioned. Accordingly, assuming the transmission of M symbols, M channel functions would be estimated in such an embodiment.

The channel function estimates generated by the time domain channel estimation circuit 1006 are supplied to the time domain channel equalization circuit 1008. The time domain channel equalization circuit 1008 performs a channel equalization operation using the channel estimate or estimates received from circuit 1006. In effect, time domain channel equalization circuit 1008 applies in the time domain a function that is the inverse of the estimated actual channel function. If the channel estimates are accurate, this will result in the elimination of distortions introduced into the transmitted signal by the communications channel. Assuming successful channel equalization, the output of the channel equalization circuit 1008 will be the original transmitted time domain signal including the set of points {Si} 322 transmitted to the receiver's user.

Alternatively, as mentioned above, the training symbols in the time domain can be used to train the channel equalization circuit 1008 directly without the first step of channel estimation. In one such embodiment channel estimation circuit 1006 is omitted from the receiver 216.

Time instant to symbol mapping circuit 1010 maps the signal values {Si} 322 at the evenly spaced points in time used to transmit the symbols in the time domain, back into the transmitted complex symbol values {Ci} 316. Receiver circuit 1010 thereby performs the inverse of transmitter circuit 318.

The complex symbols {Ci} output by time instant to symbol mapping circuit 1010 are supplied to the symbol to symbol mapping circuit 1012. The symbol mapping circuit 1012 maps the transmitted symbols {Ci} corresponding to a second constellation of symbols back to the first constellation of symbols {Bi}. In this manner, circuit 1012 performs the inverse of transmitter symbol to symbol mapping circuit 314. Like the tranmitter symbol mapping circuit 314, the receiver's symbol to symbol mapping circuit 1012 is optional and is not employed when the transmitter does not use symbol mapping circuit 314. The recovered complex symbols {Bi} are output by the OFDM receiver circuit 216, e.g., for use by subsequent circuits.

Numerous variations to the above described methods and apparatus will be apparent in view of the above discussion. Such variations are to be considered within the scope of the described invention.

What is claimed is:

1. A method of processing a frequency division multiplexed signal representing a plurality of symbols and including a plurality of tones, a first subset of said plurality of tones being allocated to a first user, the method comprising the steps of:
    performing a time domain to frequency domain transform operation on the frequency division multiplexed signal to generate a frequency domain signal therefrom;
    filtering the frequency domain signal to remove tones in said plurality of tones which are not included in said first subset of tones;
    performing a frequency domain to time domain transform operation on the filtered frequency domain signal to generate a filtered time domain signal;
    performing, after performing said frequency domain to time domain transform operation, a channel equalization operation on the filtered time domain signal; and
    recovering symbols transmitted to the first user from the filtered time domain signal following equalization.

2. The method of claim 1, wherein said frequency division multiplexed signal is an OFDM signal.

3. The method of claim 1, wherein recovering symbols further includes performing a channel estimation operation, said channel estimation operation including:
- identifying a training symbol in the filtered time domain signal; and
- generating at least one channel estimation as a function of the difference between the identified training symbol and a known training symbol value.

4. The method of claim 1,
- wherein the frequency division multiplexed signal corresponds to multiple symbol periods, the portion of the received signal corresponding to each symbol period including at least one training symbol; and
- wherein recovering symbols further includes performing a channel estimation operation, said channel estimation operation including, for each symbol period:
  - identifying a training symbol in the filtered time domain signal; and
  - generating at least one channel estimation as a function of the difference between the identified training symbol and a known training symbol value.

5. The method of claim 1, wherein the frequency division multiplexed signal corresponds to multiple dwells, each dwell being a period of time equal to multiple symbol periods, the first user being allocated the first subset of said plurality of tones for use throughout one of said dwells, the method further comprising:
- performing a channel estimation operation including, for each dwell:
  - identifying a training symbol in the filtered time domain signal received during one symbol period within the dwell; and
  - generating a channel estimation as a function of the difference between the identified training symbol and a known training symbol value.

6. The method of claim 5,
- wherein performing a channel equalization operation includes:
  - using a channel estimation generated from a training symbol received during a dwell to perform a channel equalization operation on a portion of the filtered time domain signal corresponding to a symbol period in said dwell which does not include said identified training symbol.

7. The method of claim 5,
- wherein all of a plurality of symbols received during one of said symbol periods in each dwell include training symbols;
- wherein performing a channel estimation operation for each dwell further includes:
  - generating a channel estimation for each of the training symbols received during said one of said symbol periods.

8. The method of claim 7, wherein performing a channel equalization operation includes:
- using the channel estimations generated from each of the received training symbols during said one of said symbol periods in each dwell, to perform separate channel equalization operations on each portion of the filtered time domain signal corresponding to a symbol in at least one other symbol period included in the same dwell in which the training symbols used to generate the channel estimations were received.

9. The method of claim 8, wherein the symbol period in which all received symbols are training symbols is located at the center of each dwell.

10. The method of claim 1,
- wherein the frequency division multiplexed signal is an orthogonal frequency division multiplexed signal; and
- wherein recovering symbols transmitted to the first user includes:
  - mapping values of the filtered time domain signal at instants in time used to transmit symbol values to values in a set of symbol values.

11. The method of claim 10 wherein recovering symbols transmitted to the first user further includes:
- performing a symbol value to symbol value mapping operation to map symbol values generated by mapping values of the filtered time domain signal to values in another set of symbol values.

12. The method of claim 10,
- wherein performing a time domain to frequency domain transform operation includes performing one of a Fast Fourier Transform operation and a Discrete Fourier Transform operation; and
- wherein performing a frequency domain to time domain transform operation includes performing one of an Inverse Fast Fourier Transform operation and an Inverse Discrete Cosine Transform operation.

13. The method of claim 12, further comprising:
- receiving the frequency division multiplexed signal from a communications channel including frequency division multiplexed signals corresponding to users other than the first user.

14. The method of claim 1, wherein said step of recovering symbols transmitted to the first user from the filtered time domain signal is performed by performing a time domain signal to symbol value mapping operation in the time domain.

15. The method of claim 14, wherein performing the time domain signal to symbol value mapping operation in the time domain includes generating multiple symbol values for a portion of the filtered time domain signal corresponding to a symbol transmission time period, each symbol value being generated from a different part of the filtered time domain signal.

16. The method of claim 15, wherein the value of the filtered time domain signal at a single instant in time is used to generate one symbol value.

17. The method of claim 1, wherein recovering symbols from the filtered time domain signal includes recovering a plurality of symbol values from a portion of said filtered time domain signal corresponding to a single OFDM symbol transmission time period, each symbol value corresponding to a different point in time within the single OFDM symbol transmission time period.

18. The method of claim 17, where the different points in time within the symbol transmission time period from which individual symbol values are generated are uniformly spaced in time within the single OFDM symbol transmission tune period.

19. The method of claim 1, wherein said plurality of tones includes another subset of tones allocated to another user, said another user being different from said first user, said filtering of the frequency domain signal removing tones in said another subset of tones.

20. The method of claim 19, wherein said frequency division multiplexed signal is an OFDM signal, said first subset of tones and said another subset of tones corresponding to said OFDM signal.

21. An apparatus for processing a frequency division multiplexed signal representing a plurality of symbols and including a plurality tones, a first subset of said plurality of tones being allocated to a first user, the apparatus comprising:

a time to frequency domain transform module for generating a frequency domain signal from the frequency division multiplexed signal;
a tone filter for filtering, from the frequency domain signal generated by the time to frequency domain transform module, tones other than those included in the first subset to thereby generate a filtered frequency domain signal;
a frequency to time domain transform module for performing a frequency domain to time domain transform operation on the filtered frequency domain signal to thereby generate a time domain signal;
a channel equalizer, located after said frequency to time domain transform module, for performing a channel equalization operation on the time domain signal produced by the frequency to time domain transform module; and
a time instant to symbol mapping module coupled to the channel equalizer for mapping signal values at points in time to symbol values.

22. The apparatus of claim 21, wherein the frequency division multiplexed signal is an OFDM signal.

23. The apparatus of claim 21, further comprising:
a channel estimation circuit coupled to said frequency to time domain transform module and to the channel equalizer for generating at least one channel estimate from the time domain signal and for supplying the channel estimate to the channel equalizer.

24. The apparatus of claim 23, further comprising: a symbol to symbol mapping module coupled to the time instant to symbol mapping module.

25. The apparatus of claim 23, further comprising:
a cyclic prefix discarding circuit coupled to the time to frequency domain transform module for discarding portions of the frequency division multiplexed signal corresponding to cyclic prefixes.

26. The apparatus of claim 21,
wherein the frequency division multiplexed signal is an orthogonal frequency division multiplexed signal;
wherein the time to frequency domain transform module is a Fast Fourier Transform circuit; and
wherein the frequency to time domain transform module is an inverse Fast Fourier Transform circuit.

27. The apparatus of claim 21, wherein said time instant to symbol mapping module is a time domain signal processing module which maps each one of multiple individual time instants within an OFDM symbol time period to corresponding individual symbol values according to a one to one relationship between time instants and symbol values.

28. A method of processing a received orthogonal frequency division multiplexed signal to generate symbol values, the method comprising:
performing a frequency domain to time domain transform operation to generate an OFDM time domain signal;
performing, after performing said frequency domain to time domain transform operation, a channel equalization operation on the OFDM time domain signal in the time domain; and
mapping values of the OFDM time domain signal, after channel equalization at instants in time used to transmit symbol values, to symbol values.

29. The method of claim 28, further comprising:
filleting the OFDM signal in the frequency domain to remove undesired signal tones prior to performing said channel equalization operation on the received OFDM time domain signal in the time domain.

30. The method of claim 28, wherein said mapping of values of the OFDM time domain signal after channel equalization involves performing said mapping of values in the time domain, said mapping including mapping of a plurality of individual instants in time within an OFDM symbol period to generate a corresponding plurality of symbol values, each of the plurality of symbol values corresponding to a single time instant.

31. An orthogonal frequency division multiplexed (OFDM) signal receiver for receiving an OFDM signal, the receiver comprising:
a frequency domain to time domain transform hardware module for performing a frequency domain to time domain transform operation to generate an OFOM time domain signal;
a time domain channel equalization hardware module, located after said frequency domain to time domain transform module, for performing a channel equalization operation on the OFDM time domain signal generated by said frequency to time domain transform operation; and
a time instant to symbol mapping hardware module for mapping values of the time domain signal after channel equalization at instants in time used to transmit symbol values to symbol values.

32. The receiver of claim 31, further comprising:
a time to frequency domain signal transform circuit for converting the received OFDM signal to the frequency domain; and
a tone filter coupled to the time to frequency domain signal transform circuit for performing a filtering operation on the received OFDM signal in the frequency domain.

33. The receiver of claim 31, wherein said time instant to symbol mapping module performs said mapping in the time domain, said mapping including mapping of a plurality of individual instants in time within an OFDM symbol period to generate corresponding plurality of symbol values, each of the plurality of symbol values corresponding to a different point in time.

34. A communications system composing:
an orthogonal frequency division multiplexed signal transmitter including:
a symbol to time instant mapping module for trapping a plurality of symbols to be transmitted to uniformly spaced points in time within a time period corresponding to a symbol duration; and
an orthogonal frequency division multiplexed signal receiver including:
a frequency domain to time domain transform module for performing a frequency domain to time domain transform operation on a received OFDM signal to thereby generate a time domain signal;
a time domain channel equalization module, located after said frequency domain to time domain transform module, for performing a channel equalization operation on the time domain signal; and
a time instant to symbol mapping module for mapping signal values at points in time used to transmit symbols to symbol values.

35. The system of claim 34, wherein the receiver further includes:
a time domain to frequency domain transform circuit for converting a received signal from the time domain to the frequency domain; and
a tone filter coupled to the time domain to frequency domain transform circuit for filtering tones, outside a set of tones used by the receiver, from the received signal in the frequency domain, an output of the tone filter supplying the input to the frequency domain to time domain transform circuit.

36. The system of claim 34, wherein the received OFDM signal includes a plurality of uniformly spaced OFDM tones.

37. The system of claim 34, wherein said time instant to symbol mapping module maps different points in time within a single OFDM symbol transmission tune period to determine individual symbol values corresponding to individual ones of said different points in time.

38. An apparatus comprising:
a processor for processing a frequency division multiplexed signal representing a plurality of symbols and including a plurality of tones, a first subset of said plurality of tones being allocated to a first user, the processor being configured to:
perform a time domain to frequency domain transform operation on the frequency division multiplexed signal to generate a frequency domain signal therefrom;
filter the frequency domain signal to remove tones in said plurality of tones which are not included in said first subset of tones;
perform a frequency domain to time domain transform operation on the filtered frequency domain signal to generate a filtered time domain signal;
perform, after performing said frequency domain to time domain transform operation, a channel equalization operation on the filtered time domain signal; and
recover symbols transmitted to the first user from the filtered time domain signal following equalization.

39. An apparatus for processing a frequency division multiplexed signal representing a plurality of symbols and including a plurality tones, a first subset of said plurality of tones being allocated to a first user, the apparatus comprising:
time to frequency domain transform means for generating a frequency domain signal from the frequency division multiplexed signal;
tone filter means for filtering, from the frequency domain signal generated by the time to frequency domain transform means, tones other than those included in the first subset to thereby generate a filtered frequency domain signal;
a frequency to time domain transform means for performing a frequency domain to time domain transform operation on the filtered frequency domain signal to thereby generate a time domain signal;
channel equalizer means, located after said frequency to time domain transform means, for performing a channel equalization operation on the time domain signal produced by the frequency to time domain transform means; and
time instant to symbol mapping means, coupled to the channel equalizer means, for mapping signal values at points in time to symbol values.

40. The apparatus of claim 39, wherein the frequency division multiplexed signal is an OFDM signal.

41. The apparatus of claim 39, further comprising:
channel estimation means coupled to said frequency to time domain transform means and to the channel equalizer means for generating at least one channel estimate from the time domain signal and for supplying the channel estimate to the channel equalizer means.

42. The apparatus of claim 41, further comprising:
symbol to symbol mapping means for performing a symbol to symbol mapping operation, said symbol to symbol mapping means being coupled to the time instant to symbol mapping means.

43. An orthogonal frequency division multiplexed (OFDM) signal receiver for receiving an OFDM signal, the receiver comprising:
frequency domain to time domain transform means for performing a frequency domain to time domain transform operation to generate an OFDM time domain signal;
time domain channel equalization means, located after said frequency domain to time domain transform means, for performing a channel equalization operation on the OFDM time domain signal generated by said frequency to time domain transform means; and
time instant to symbol mapping means for mapping values of the time domain signal after channel equalization at instants in time used to transmit symbol values to symbol values.

44. The receiver of claim 43, further comprising:
time to frequency domain signal transform means for converting the received OFDM signal to the frequency domain; and
tone filter means, coupled to the time to frequency domain signal transform means, for performing a filtering operation on the received OFDM signal in the frequency domain.

45. A communications system comprising:
orthogonal frequency division multiplexed signal transmitter means for generating and transmitting an orthogonal frequency division multiplexed signal, said orthogonal frequency division multiplexed signal transmitter means including:
symbol to time instant mapping means for mapping a plurality of symbols to be transmitted to uniformly spaced points in time within a time period corresponding to a symbol duration; and
orthogonal frequency division multiplexed signal receiver means for receiving and processing said orthogonal frequency division multiplexed signal, said orthogonal frequency division multiplexed signal receiver means including:
frequency domain to time domain transform means for performing a frequency domain to time domain transform operation on said received orthogonal frequency division multiplexed signal to thereby generate a time domain signal;
time domain channel equalization means, located alter said frequency domain to time domain transform means, for performing a channel equalization operation on the time domain signal; and
time instant to symbol mapping means for mapping signal values at points in time used to transmit symbols to symbol values.

46. The system of claim 45, wherein the receiver means further includes:
time domain to frequency domain transform means for converting a received signal from the time domain to the frequency domain; and
tone filter means coupled to the time domain to frequency domain transform means for filtering tones, outside a set of tones used by the receiver means, from the received signal in the frequency domain, an output of the tone filter means supplying the input to the frequency domain to time domain transform means.

47. The system of claim 45, wherein the received OFDM signal includes a plurality of uniformly spaced OFDM tones.

48. A computer program product, comprising:
a non-transitory computer-readable medium comprising:
a first set of codes for causing a computer to execute a time domain to frequency domain transform operation on the frequency division multiplexed signal to generate a frequency domain signal therefrom;
a second set of codes for causing a computer to filter the frequency domain signal to remove tones in said plurality of tones which are not included in said first subset of tones;
a third set of codes for causing a computer to execute a frequency domain to time domain transform operation on the filtered frequency domain signal to generate a filtered time domain signal;
a fourth set of codes for causing a computer to execute, after performing said frequency domain to time domain transform operation, a channel equalization operation on the filtered time domain signal; and
a fifth set of codes for causing a computer to acquire symbols transmitted to the first user from the filtered time domain signal following equalization.

* * * * *